(12) United States Patent  
Matityahu et al.

(10) Patent No.: US 9,306,959 B2
(45) Date of Patent: Apr. 5, 2016

(54) DUAL BYPASS MODULE AND METHODS THEREOF

(75) Inventors: Eldad Matityahu, Palo Alto, CA (US); Robert Shaw, Los Gatos, CA (US); Dennis Carpio, San Jose, CA (US); Siuman Hui, Millbrae, CA (US); Wei Lian, Fremont, CA (US)

(73) Assignee: Ixia, Calabasas, CA (US)

( * ) Notice: Subject to any disclaimer, the term of this patent is extended or adjusted under 35 U.S.C. 154(b) by 467 days.

(21) Appl. No.: 13/034,736

(22) Filed: Feb. 25, 2011

(65) Prior Publication Data

US 2011/0214181 A1 Sep. 1, 2011

Related U.S. Application Data

(60) Provisional application No. 61/308,868, filed on Feb. 26, 2010.

(51) Int. Cl.
*H04L 29/06* (2006.01)
*H04L 12/24* (2006.01)
*H04L 12/26* (2006.01)

(52) U.S. Cl.
CPC ........ *H04L 63/1416* (2013.01); *H04L 41/0668* (2013.01); *H04L 43/12* (2013.01); *H04L 63/20* (2013.01); *H04L 43/10* (2013.01)

(58) Field of Classification Search
CPC ..... H04L 63/1416; H04L 63/20; H04L 43/10; H04L 43/12
USPC ............ 726/3, 13, 22, 23; 370/223, 242, 248, 370/289
See application file for complete search history.

(56) References Cited

U.S. PATENT DOCUMENTS

| 4,802,161 A | 1/1989 | Byars et al. |
| 5,173,794 A | 12/1992 | Cheung et al. |

(Continued)

FOREIGN PATENT DOCUMENTS

| EP | 2091199 | 8/2009 |
| JP | 2001-197066 A | 7/2001 |
| JP | 2006-148686 A | 6/2006 |
| KR | 10-2004-0058415 A | 7/2004 |
| WO | WO-02/19642 A1 | 3/2002 |

(Continued)

OTHER PUBLICATIONS

Kuboniwa, Akiko, et al. "IPsec-GW redundancy method with high reliability." Information and Telecommunication Technologies (APSITT), 2010 8th Asia-Pacific Symposium on. (pp. 1-5). IEEE, 2010.*

(Continued)

*Primary Examiner* — Kari Schmidt
(74) *Attorney, Agent, or Firm* — Jenkins, Wilson, Taylor & Hunt, P.A.

(57) ABSTRACT

A dual bypass module for managing an integrated secured network environment is provided. The module includes network ports that receive and transmit data traffic flowing through the network. The module also includes a set of monitoring ports that is configured for transmitting the data traffic between the dual bypass module and a set of monitoring systems. The module further includes a set of relays configured for controlling the flow of data through the dual bypass module. The module yet also includes a configurable integrated circuit. The configurable integrated circuit includes at least one of a first logic arrangement for determining conditions of the set of monitoring systems, a second logic arrangement for redirecting the data traffic through a secured alternate path when a monitoring system is unavailable, and a third logic arrangement for redirecting the data traffic through a secured alternate path when a communication path becomes unavailable.

15 Claims, 15 Drawing Sheets

(56) References Cited

U.S. PATENT DOCUMENTS

| | | | |
|---|---|---|---|
| 5,539,727 A | 7/1996 | Kramarczyk et al. | |
| 5,550,802 A | 8/1996 | Worsley et al. | |
| 5,648,965 A | 7/1997 | Thadani et al. | |
| 5,696,859 A | 12/1997 | Onaka et al. | |
| 5,710,846 A | 1/1998 | Wayman et al. | |
| 5,774,453 A | 6/1998 | Fukano et al. | |
| 5,781,318 A | 7/1998 | Tremblay | |
| 5,825,775 A | 10/1998 | Chin et al. | |
| 5,983,308 A | 11/1999 | Kerstein | |
| 6,041,037 A | 3/2000 | Nishio et al. | |
| 6,047,321 A | 4/2000 | Raab et al. | |
| 6,108,310 A | 8/2000 | Wilkinson et al. | |
| 6,167,025 A | 12/2000 | Hsing et al. | |
| 6,272,113 B1* | 8/2001 | McIntyre et al. | 370/248 |
| 6,272,136 B1 | 8/2001 | Lin et al. | |
| 6,289,511 B1 | 9/2001 | Hubinette | |
| 6,366,557 B1 | 4/2002 | Hunter | |
| 6,381,218 B1* | 4/2002 | McIntyre et al. | 370/245 |
| 6,389,550 B1* | 5/2002 | Carter | H04L 29/06 709/229 |
| 6,424,627 B1 | 7/2002 | Sorhaug et al. | |
| 6,449,247 B1 | 9/2002 | Manzardo et al. | |
| 6,542,145 B1 | 4/2003 | Reisinger et al. | |
| 6,650,803 B1 | 11/2003 | Ramaswami et al. | |
| 6,658,565 B1 | 12/2003 | Gupta et al. | |
| 6,687,009 B2 | 2/2004 | Hui et al. | |
| 6,687,847 B1 | 2/2004 | Aguilera et al. | |
| 6,714,976 B1 | 3/2004 | Wilson et al. | |
| 6,798,740 B1 | 9/2004 | Senevirathne et al. | |
| 6,801,940 B1 | 10/2004 | Moran et al. | |
| 6,823,383 B2 | 11/2004 | MacBride | |
| 6,841,985 B1 | 1/2005 | Fetzer | |
| 6,850,706 B2 | 2/2005 | Jager et al. | |
| 6,882,654 B1 | 4/2005 | Nelson | |
| 6,898,630 B2 | 5/2005 | Ueno et al. | |
| 6,898,632 B2 | 5/2005 | Gordy et al. | |
| 6,925,052 B1 | 8/2005 | Reynolds et al. | |
| 6,944,437 B2 | 9/2005 | Yang et al. | |
| 6,975,209 B2 | 12/2005 | Gromov | |
| 7,027,437 B1 | 4/2006 | Merchant et al. | |
| 7,171,504 B2 | 1/2007 | Ishii | |
| 7,275,100 B2* | 9/2007 | Yamagami | H04L 29/06 709/213 |
| 7,277,957 B2 | 10/2007 | Rowley et al. | |
| 7,308,705 B2 | 12/2007 | Gordy et al. | |
| 7,321,565 B2 | 1/2008 | Todd et al. | |
| 7,324,553 B1 | 1/2008 | Varier et al. | |
| 7,362,765 B1 | 4/2008 | Chen | |
| 7,415,013 B1 | 8/2008 | Lo | |
| 7,430,354 B2 | 9/2008 | Williams | |
| 7,477,611 B2 | 1/2009 | Huff | |
| 7,486,624 B2 | 2/2009 | Shaw et al. | |
| 7,486,625 B2 | 2/2009 | Matityahu et al. | |
| 7,499,412 B2 | 3/2009 | Matityahu et al. | |
| 7,505,416 B2 | 3/2009 | Gordy et al. | |
| 7,522,543 B2 | 4/2009 | Matityahu et al. | |
| 7,594,092 B1 | 9/2009 | Sae-Koe | |
| 7,599,301 B2* | 10/2009 | Matityahu et al. | 370/242 |
| 7,616,587 B1 | 11/2009 | Lo et al. | |
| 7,760,859 B2 | 7/2010 | Matityahu et al. | |
| 7,773,529 B2 | 8/2010 | Matityahu et al. | |
| 7,813,263 B2* | 10/2010 | Chang | H04L 12/462 370/216 |
| 7,835,265 B2* | 11/2010 | Wang et al. | 370/216 |
| 7,898,984 B2 | 3/2011 | Matityahu et al. | |
| 7,903,576 B2 | 3/2011 | Matityahu et al. | |
| 8,018,856 B2 | 9/2011 | Matityahu et al. | |
| 8,094,576 B2 | 1/2012 | Matityahu et al. | |
| 8,320,242 B2 | 11/2012 | Matityahu et al. | |
| 8,369,218 B2 | 2/2013 | Matityahu et al. | |
| 8,737,197 B2 | 5/2014 | Matityahu et al. | |
| 9,019,863 B2 | 4/2015 | Matityahu et al. | |
| 2001/0040870 A1 | 11/2001 | Ohmori et al. | |
| 2002/0003592 A1 | 1/2002 | Hett et al. | |
| 2002/0026374 A1 | 2/2002 | Moneymaker et al. | |
| 2002/0032880 A1 | 3/2002 | Poletto et al. | |
| 2002/0073199 A1 | 6/2002 | Levine et al. | |
| 2002/0087710 A1 | 7/2002 | Aiken et al. | |
| 2002/0146016 A1 | 10/2002 | Liu et al. | |
| 2002/0176355 A1 | 11/2002 | Mimms et al. | |
| 2002/0180592 A1 | 12/2002 | Gromov | |
| 2003/0112760 A1 | 6/2003 | Puppa et al. | |
| 2003/0142666 A1 | 7/2003 | Bonney et al. | |
| 2003/0184386 A1 | 10/2003 | Varner et al. | |
| 2003/0215236 A1 | 11/2003 | Manifold | |
| 2004/0008675 A1 | 1/2004 | Basso et al. | |
| 2004/0023651 A1 | 2/2004 | Gollnick et al. | |
| 2004/0062556 A1 | 4/2004 | Kubo et al. | |
| 2004/0085893 A1* | 5/2004 | Wang et al. | 370/216 |
| 2004/0096227 A1 | 5/2004 | Bulow | |
| 2004/1008589 | 5/2004 | Wang et al. | |
| 2004/0109411 A1 | 6/2004 | Martin | |
| 2004/0120259 A1 | 6/2004 | Jones et al. | |
| 2004/0128380 A1 | 7/2004 | Chen et al. | |
| 2004/0190547 A1* | 9/2004 | Gordy et al. | 370/463 |
| 2004/0202164 A1 | 10/2004 | Hooper et al. | |
| 2004/0215832 A1 | 10/2004 | Gordy et al. | |
| 2005/0005031 A1 | 1/2005 | Gordy et al. | |
| 2005/0060535 A1 | 3/2005 | Bartas | |
| 2005/0071711 A1 | 3/2005 | Shaw | |
| 2005/0108444 A1 | 5/2005 | Flauaus et al. | |
| 2005/0122910 A1 | 6/2005 | Parupudi et al. | |
| 2005/0129033 A1 | 6/2005 | Gordy et al. | |
| 2005/0132051 A1 | 6/2005 | Hill et al. | |
| 2005/0231367 A1 | 10/2005 | Bellantoni | |
| 2005/0257262 A1 | 11/2005 | Matityahu et al. | |
| 2005/0271065 A1 | 12/2005 | Gallatin et al. | |
| 2006/0002292 A1* | 1/2006 | Chang | H04L 12/462 370/225 |
| 2006/1000229 | 1/2006 | Chang et al. | |
| 2006/0083268 A1 | 4/2006 | Holaday et al. | |
| 2006/0083511 A1 | 4/2006 | Edmunds et al. | |
| 2006/0153092 A1 | 7/2006 | Matityahu et al. | |
| 2006/0200711 A1 | 9/2006 | Schondelmayer et al. | |
| 2006/0215566 A1 | 9/2006 | Walsh | |
| 2006/0233115 A1 | 10/2006 | Matityahu et al. | |
| 2006/0282529 A1 | 12/2006 | Nordin | |
| 2007/0002754 A1 | 1/2007 | Matityahu et al. | |
| 2007/0002755 A1* | 1/2007 | Matityahu et al. | 370/242 |
| 2007/0002769 A1 | 1/2007 | Matityahu et al. | |
| 2007/0064917 A1 | 3/2007 | Matityahu et al. | |
| 2007/0081549 A1 | 4/2007 | Cicchetti et al. | |
| 2007/0081553 A1 | 4/2007 | Cicchetti et al. | |
| 2007/0121499 A1 | 5/2007 | Pal et al. | |
| 2007/0171966 A1 | 7/2007 | Light et al. | |
| 2007/0174492 A1 | 7/2007 | Light et al. | |
| 2007/0211682 A1 | 9/2007 | Kim et al. | |
| 2007/0213862 A1 | 9/2007 | Chang et al. | |
| 2007/0253329 A1* | 11/2007 | Rooholamini | H04Q 3/54558 370/220 |
| 2008/0014879 A1 | 1/2008 | Light et al. | |
| 2008/0049627 A1 | 2/2008 | Nordin | |
| 2008/1007229 | 3/2008 | Jeffrey | |
| 2008/0144613 A1* | 6/2008 | Adhikari et al. | 370/389 |
| 2008/0198742 A1* | 8/2008 | Kaempfer | 370/230 |
| 2008/0214108 A1 | 9/2008 | Beigne et al. | |
| 2009/0040932 A1 | 2/2009 | Matityahu et al. | |
| 2009/0041051 A1 | 2/2009 | Matityahu et al. | |
| 2009/0219808 A1* | 9/2009 | Ogura | 370/223 |
| 2010/0014605 A1 | 1/2010 | Geile et al. | |
| 2010/0135313 A1* | 6/2010 | Davis et al. | 370/419 |
| 2010/0146113 A1 | 6/2010 | Matityahu et al. | |

FOREIGN PATENT DOCUMENTS

| | | |
|---|---|---|
| WO | WO-2004/012163 A2 | 2/2004 |
| WO | WO-2005/043838 A1 | 5/2005 |

OTHER PUBLICATIONS

Liang, Chieh-Jan Mike, et al. "Racnet: a high-fidelity data center sensing network." Proceedings of the 7th ACM Conference on Embedded Networked Sensor Systems. (pp. 15-28). ACM, 2009.*

(56) References Cited

OTHER PUBLICATIONS

"International Search Report", PCT Application No. PCT/US2011/026160, Mailing Date: Nov. 24, 2011.
"Written Opinion", PCT Application No. PCT/US2011/026160, Mailing Date: Nov. 24, 2011.
"International Preliminary Report on Patentability", PCT Application No. PCT/US2011/026160, Mailing Date: Sep. 7, 2012.
"International Preliminary Report on Patentability", PCT Application No. PCT/US2011/026162, Mailing Date: Sep. 7, 2012.
"International Preliminary Report on Patentability", PCT Application No. PCT/US2011/026165, Mailing Date: Sep. 7, 2012.
"Written Opinion", Issued in PCT Application No. PCT/US2006/25436, Mailing Date: Mar. 4, 2008.
"International Search Report", Issued in PCT Application No. PCT/US2006/25436, Mailing Date: Mar. 4, 2008.
"International Preliminary Report on Patentability", Application No. PCT/US06/25436, Mailing Date: May 22, 82008.
"Non Final Office Action", U.S. Appl. No. 11/223,477, Mailing Date: Jun. 12, 2008.
"Non Final Office Action", U.S. Appl. No. 11/174,033, Mailing Date: May 29, 2008.
"Final Office Action", U.S. Appl. No. 11/174,033, Mailing Date: Dec. 10, 2008.
"Non Final Office Action", U.S. Appl. No. 11/174,033, Mailing Date: Sep. 15, 2009.
"Final Office Action", U.S. Appl. No. 11/174,033, Mailing Date: Jun. 24, 2010.
"Non Final Office Action", U.S. Appl. No. 11/174,033, Mailing Date: Apr. 28, 2011.
"Non Final Office Action", U.S. Appl. No. 11/174,032, Mailing Date: Apr. 23, 2008.
"Inter Partes ReexaminationOffice Action", U.S. Appl. No. 95/001,318, Patent in Re-examination: U.S. Pat. No. 7,486,625, Mailing Date: Apr. 23, 2010.
"Replacement Statement and Explanation under 37CFR 1.915 In Support of Request for Inter Partes Reexamination of U.S. Pat. No. 7,486,625", Sonnenschein Nath & Rosenthal, LLP, Jan. 22, 2010, 251 pages.
"Request for Inter Partes Reexamination of U.S. Pat. No. 7,486,625", Sonnenschein Nath & Rosenthal LLP, Jan. 18, 2009, 69 pages.
Non Final Office Action, U.S. Appl. No. 11/174,238, Mailing Date: Oct. 1, 2008.
"International Preliminary Report on Patentabiiity", Issued in PCT Application No. PCT/US2006/025437, Mailing Date: Jan. 17, 2008.
"International Search Report", Application No. PCT/US2006/25437, Mailing Date: Dec. 6, 2006.
"Written Opinion", Application No. PCT/US2006/25437, Mailing Date: Dec. 6, 2006.
"Non Final Office Action", U.S. Appl. No. 11/370,487, Mailing Date: Mar. 25, 2009.
"Non Final Office Action", U.S. Appl. No. 11/370,487, Mailing Date: Jun. 11, 2009.
"International Search Report", Issued in PCT Application No. PCT/US2008/072484, Mailing Date: Feb. 13, 2009.
"Written Opinion", issued in PCT Application No. PCT/US2008/072484, Mailing Date: Feb. 13, 2009.
"International Preliminary Report on Patentability", Issued in PCT Application No. PCT/US2008/072484, Mailing Date: Feb. 18, 2010.
"Non Final Office Action", U.S. Appl. No. 11/835,228, Mailing Date: Sep. 9, 2010.
"International Search Report", Issued in PCT Application No. PCT/US2008/072493, Mailing Date: Feb. 13, 2009.
"Written Opinion", Issued in PCT Application No. PCT/US2008/072493, Mailing Date: Feb. 13, 2009.
"International Preliminary Report on Patentability", Issued in PCT Application No. PCT/US2008/072493, Mailing Date: Feb. 18, 2010.
"Non Final Office Action", U.S. Appl. No. 11/835,233, Mailing Date: Jun. 9, 2009.
"Final Office Action", U.S. Appl. No. 11/835,233, Mailing Date: Oct. 30, 2009.
"Non Final Office Action", U.S. Appl. No. 11/835,233, Mailing Date: Jun. 25, 2010.
"International Search Report", Issued in PCT Application No. PCT/US2008/080598, Mailing Date: May 26, 2009.
"Written Opinion", Issued in PCT Application No. PCT/US2008/080598, Mailing Date: May 26, 2009.
"Notice of Allowance and Fees Due", U.S. Appl. No. 11/925,626, Mailing Date: Jun. 18, 2010.
"European Search Report", issued in EP Patent Application No. EP 08 17 1759, Mailing Date: Jul. 31, 2009.
"Notice of Allowance and Fee(s) Due", U.S. Appl. No. 11/965,868, Mailing Date: Oct. 8, 2009.
"Non Final Office Action", U.S. Appl. No. 12/705,195, Mailing Date: Dec. 27, 2010.
"Written Opinion", Issued in PCT Application No. PCT/US2010/037985, Mailing Date: Dec. 31, 2010.
"International Search Report", issued in PCT Application No. PCT/US2010/037985, Mailing Date: Dec. 31, 2010.
"Non Final Office Action", U.S. Appl. No. 12/481,847, Mailing Date: Nov. 4, 2010.
"Final Office Action", U.S. Appl. No. 12/481,847, Mailing Date: Feb. 9, 2011.
"Non Final Office Action", U.S. Appl. No. 10/834,448, Mailing Date: Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 7, 2008.
"Non Final Office Action", U.S. Appl. No. 10/834,448, Mailing Date: Feb. 18, 2010.
"Final Office Action", U.S. Appl. No. 10/834,448, Mailing Date: Aug. 3, 2010.
"International Search Report", PCT Application No. PCT/US2011/026162, Mailing Date: Nov. 30, 2011.
"Written Opinion", PCT Application No. PCT/US2011/026162, Mailing Date: Nov. 30, 2011.
"International Search Report", PCT Application No. PCT/US2011/026165, Mailing Date Nov. 30, 2011.
"Written Opinion", PCT Application No. PCT/US2011/026165, Mailing Date: Nov. 30, 2011.
Belkin International, Inc., "Belkin Quick Installation Guide", N1 Vision Wireless Router, Belkin International, Inc., Compton, CA, Feb. 11, 2009, 3 pages total.
Belkin International, Inc., "Network Status Display", Belkin International, Inc., Compton, CA, 2007, 1 page total.
HP, et al., "Reduced Gigabit Media Independent Interface (RGMII)", Nov. 30, 2005, http://web.archive.org/web/20051113015000/http://www.hp.com/rnd/pdfs/RGMIIv2_$_{10}$_final_hp.Pdf.
Wikipedia, "Field-programmable Gate Array", Jan. 21, 2005, http://web.archive.org/web/20050121193052/http://en.wi kiped ia.org/wiki/Field-programmeble_gate_array.
XILINX, "LogiCore OPB Ethernet Lite Media Access Controller", v1.01b, Mar. 3, 2006.
"Fast Ethernet Fiber-to-Fiber Converters", Canary Communications, Inc. 7 pages total, 2004.
"Sequence Reducer/ Sequence Mirror Operator's Guide", Peribit Networks, Inc. 13 pages total. 2001-2005.
"PeriScope Central Management System (CMS) 5.0 Administrator's Guide", Peribit Networks, Inc. 13 pages total. 2003-2004.
"VSS Coppertap Literature", VSS Monitoring Inc. 2 pages. 2003-2004.
"VSS Easy Install Guide", VSS Monitoring Inc. 8 pages total, 2003-2005.
"VSS Linksafe", VSS Monitoring Inc., 1 page. 2003-2005.
Anonymous, "100Base-TX/100BBase-FX Media Converters E-100BTX-FX-04 User's Guide", Transitions Networks, Minneapolis, MN, Copyright 1998-2000, 4 pages.
Gigamon Systems LLC, "GigaVUE—Product Brief", Gigamon Systems LLC, http://web.archive.org/web/20070815021951/www.gigamon.com/pdf/GigamonSystems-OnePageProductBrief.pdf, Aug. 15, 2007, 1 page.

(56) References Cited

OTHER PUBLICATIONS

"Non Final Office Action", U.S. Appl. No. 13/034,732, Mailing Date: Feb. 14, 2013.

"Non Final Office Action", U.S. Appl. No. 13/034,733, Mailing Date: Feb. 28, 2013.

"Final Office Action", U.S. Appl. No. 13/034,732, Mailing Date: Oct. 2, 2013.

"Final Office Action", U.S. Appl. No. 13/034,733, Mailing Date: Sep. 10, 2013.

"Non Final Office Action", U.S. Appl. No. 13/034,733, Mailing Date: Apr. 9, 2014.

* cited by examiner

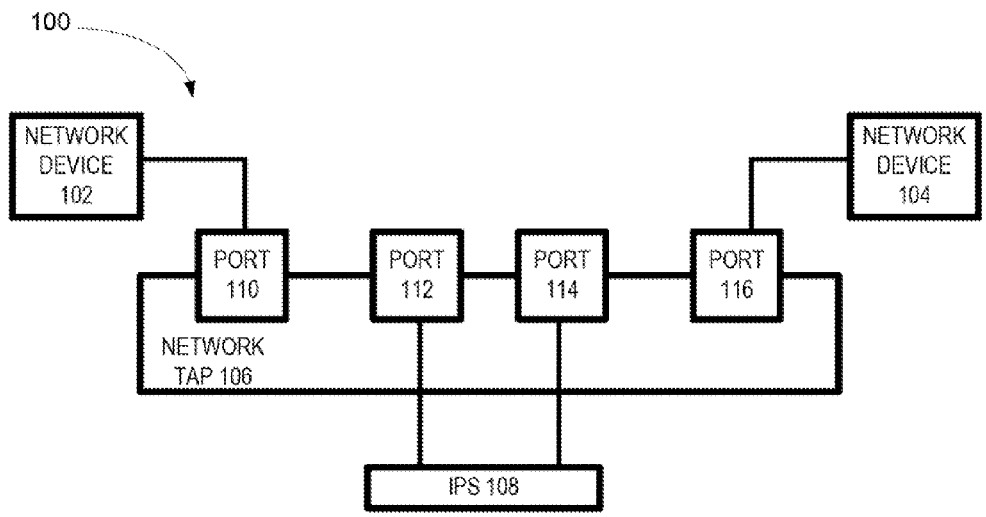
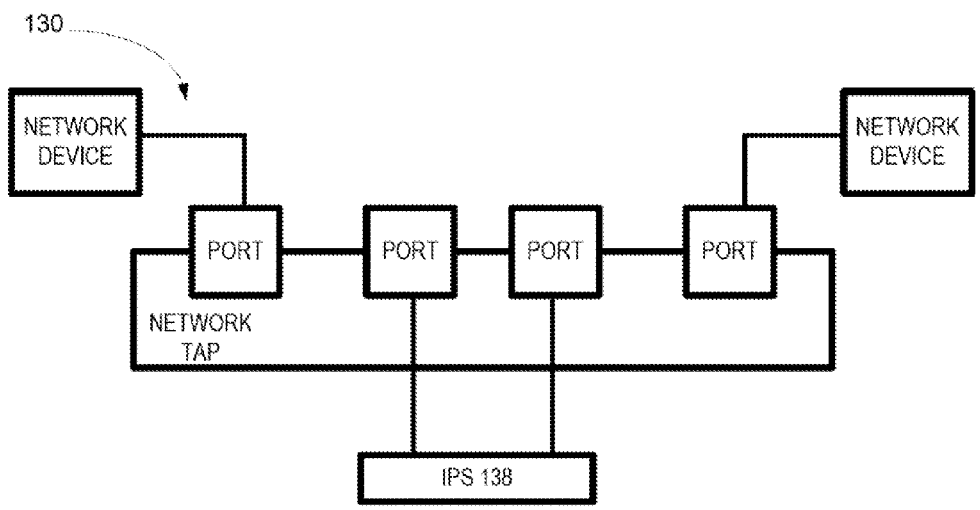
FIG. 1A
(PRIOR ART)

| CONDITION | COUNTER | COUNTER RULE |
|---|---|---|
| SIMULATE TCP SESSION FROM PORT 402 | COUNTER A 460 | TX = + 1 RX = RESET TO 0 |
| SIMULATE CONDITION FOR A FIRST SECURITY POLICY | COUNTER B 462 | TX = +1 RX = -1 |
| SIMULATE CONDITION FOR A SECOND SECURITY POLICY | COUNTER C 464 | TX = +1 RX = -1 |
| SIMULATE TCP SESSION FROM PORT 404 | COUNTER D 466 | TX = + 1 RX = RESET TO 0 |
| SIMULATE CONDITION FOR A THIRD SECURITY POLICY | COUNTER E 468 | TX = + 1 RX = RESET TO 0 |
| SIMULATE CONDITION FOR A FOURTH SECURITY POLICY | COUNTER F 470 | TX = + 1 RX = RESET TO 0 |
| CONDITION N | COUNTER N | COUNTER RULE N |

FIG. 4B

| FAILURE CONDITION | EVENT(S) |
|---|---|
| COUNTER 460 >3 | SWITCH TO BYPASS MODE AND NOTIFY OPERATOR |
| ALL COUNTERS FOR PATH 430 >6 | SWITCH TO BYPASS MODE AND NOTIFY OPERATOR/ADMINISTRATOR |
| COUNTER 462 >4 | NOTIFY OPERATOR |
| COUNTER 464 > 2 AND COUNTER 462 >2 | EMAIL OPERATOR |
| ALL COUNTERS FOR PATH 432 >4 | SWITCH TO BYPASS MODE |
| COUNTER 466 >3 | SEND WARNING TO OPERATOR |
| FAILURE CONDITION N | EVENT N |

FIG. 5

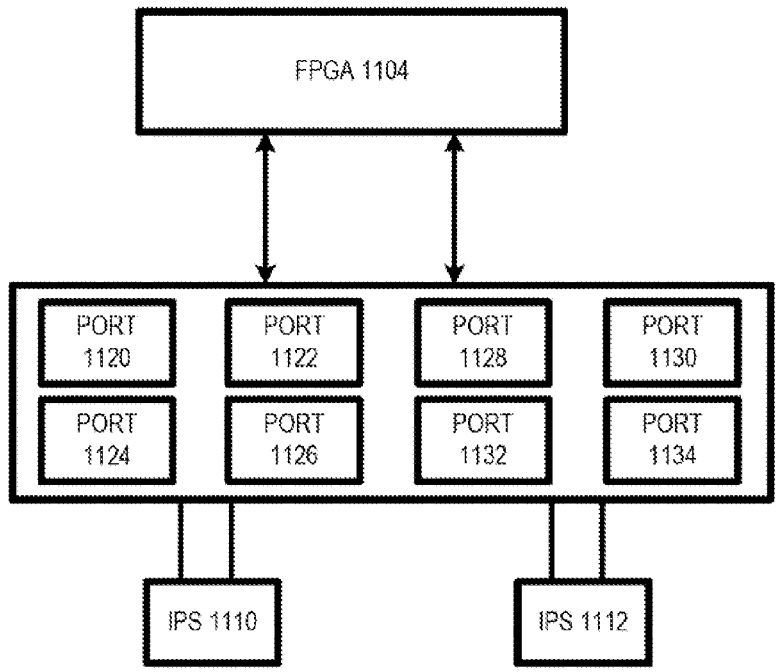

| PATH | DETAILS |
|---|---|
| PATH 1140 | PORT 1120-FPGA 1104-PORT 1128-IPS 1110-PORT 1130-FPGA 1104-PORT 1122 |
| PATH 1142 | PORT 1122-FPGA 1104-PORT 1128-IPS 1110-PORT 1130-FPGA 1104-PORT 1120 |
| PATH 1144 | PORT 1124-FPGA 1104-PORT 1128-IPS 1110-PORT 1130-FPGA 1104-PORT 1126 |
| PATH 1146 | PORT 1126-FPGA 1104-PORT 1128-IPS 1110-PORT 1130-FPGA 1104-PORT 1124 |
| PATH 1148 | PORT 1120-FPGA 1104-PORT 1132-IPS 1112-PORT 1134-FPGA 1104-PORT 1122 |
| PATH 1150 | PORT 1122-FPGA 1104-PORT 1132-IPS 1112-PORT 1134-FPGA 1104-PORT 1120 |
| PATH 1152 | PORT 1124-FPGA 1104-PORT 1132-IPS 1112-PORT 1134-FPGA 1104-PORT 1126 |
| PATH 1154 | PORT 1126-FPGA 1104-PORT 1132-IPS 1112-PORT 1134-FPGA 1104-PORT 1124 |
| PATH 1156 | PORT 1120-FPGA 1104-PORT 1122 |
| PATH 1158 | PORT 1122-FPGA 1104-PORT 1120 |
| PATH 1160 | PORT 1124-FPGA 1104-PORT 1126 |
| PATH 1162 | PORT 1126-FPGA 1104-PORT 1124 |

FIG. 11

DUAL BYPASS MODULE AND METHODS THEREOF

PRIORITY CLAIM

The present invention claims priority under 35 U.S.C. 119(e) to a commonly owned provisionally filed patent application entitled "iBypass High Density and Methods Thereof," U.S. Application No. 61/308,868, filed on Feb. 26, 2010, by inventors Matityahu et al., all of which is incorporated herein by reference.

CROSS REFERENCE TO RELATED APPLICATIONS

The present invention is related to the following application, all of which are incorporated herein by reference:

Commonly assigned application entitled "Sequential Heartbeat Packet Arrangement and Methods Thereof," filed on even date herewith by the same inventors herein Ser. No. 13/034,732, which claims priority under 35 U.S.C. 119(e) to a commonly owned provisionally filed patent application entitled "Sequential Heartbeat Packet Arrangement and Methods Thereof," U.S. Application No. 61/308,867, filed on Feb. 26, 2010, by inventors Matityahu, all of which is incorporated herein by reference.

BACKGROUND OF THE INVENTION

In today's society, a company may depend upon its network to be fully functionally in order to conduct business. To ensure the vitality of the company, the network may have to be protected from external attacks (such as virus attacks, malware attacks, etc.). Accordingly, the network may be monitored to ensure reliable operation, fault detection, timely mitigation of potentially malicious activities and the like. One method for monitoring the network includes the installation of an inline network tap and one or more monitoring systems (such as intrusion prevention systems, intrusion detection systems, firewalls, packet sniffers, and the like).

To facilitate discussion, FIG. 1A shows a simple block diagram of a network environment. Consider the situation wherein, for example, data traffic is flowing through a network arrangement 100. In an example, data traffic is flowing between a network device 102 and a network device 104. To monitor the data traffic flowing through the network, an inline network tap 106 may be employed.

To ensure accessibility, a company may have parallel lines running to its network. In other words, the company may have two independent network arrangements (network arrangement 100 and a network arrangement 130). Thus, if network arrangement 100 is unavailable (e.g., network arrangement may not be responding due to traffic congestion and/or being offline, for example), data traffic may be routed through network arrangement 130 instead.

To provide a secured network environment, each network arrangement may be coupled to monitor/security systems, such as intrusion prevention systems (IPSs) 108 and 138, for example. Accordingly, data traffic may be routed through one of the IPSs before being routed to its destination. In an example, data traffic flowing through network arrangement 100 may flow from network device 102 through port 110 out of port 112 to IPS 108 before flowing back through port 114 and out of port 116 before flowing to network device 104.

The cost of establishing and maintaining two independent network arrangements can become quite expensive. A typical secured network arrangement can cost at least a few hundred thousands dollars (the cost of a monitoring system may range from about 100 thousands to 500 thousands dollar per unit). However, many companies are willing to accept this cost in order to be accessible while being protected from malicious attacks.

Although the two independent network arrangements (100 and 130) provide for a redundant secured network environment if a data path is unavailable, two independent network arrangements may not always guarantee that the data traffic flowing through either network arrangement 100 or network arrangement 130 is secured. In the aforementioned example, data traffic flowing through network arrangement 100 is flowing through IPS 108. However, if IPS 108 is not functioning properly, network arrangement 100 is still available to direct traffic from network device 102 to network device 104. In other words, data traffic is flowing through network arrangement 100 and has not been diverted to network arrangement 130 since network arrangement 100 is still available (e.g., no traffic congestion). Unfortunately, the data traffic that is flowing through network arrangement 100 is unprotected and may be exposed to external attacks.

For some companies, the cost of being unprotected can be financially detrimental. As a result, a secondary secured arrangement may be employed to ensure that a company's network continues to be available as a secured environment. In other words, instead of a single inline network tap arrangement, the primary inline network tap arrangement is coupled to a secondary inline network tap arrangement. To facilitate discussion, FIG. 1B shows a simple block diagram of a highly available secured network environment 150.

In an example, a secondary inline network tap 176 is physically connected to a primary inline network tap 156. Thus, when data traffic from a network device 152 is received by inline network tap 156, the data traffic is routed through secondary inline network tap 176 before being routed onward to network device 154. For example, data traffic flows through a port 160 through a port 162 to an IPS 158 back through a port 164 and out of a port 166. However, unlike the non-redundant network environment, the data traffic is then routed through the secondary inline network arrangement (through port 180 and out of port 186) before being routed onward to network device 154.

Although an IPS 178 is connected to secondary inline network tap 176, IPS 178 usually remains passive if IPS 158 is functioning properly. However, if IPS 158 fails to be working properly, the secondary inline network arrangement with IPS 178 is available for maintaining the secured environment. In an example, a diagnostic test (such as a single heartbeat diagnostic test) may be performed in which a unique data packet (also known as a heartbeat packet) may be inserted into the data traffic when the data traffic flow from port 162 to IPS 158. If a predefined number of heartbeat packets fails to return to inline network tap 156, a problem is deemed to exist with IPS 158. In order to maintain the secured environment, the network environment may be moved into a secondary mode in which IPS 178 is now providing the protection for the company's network. In an example, data traffic flowing from network device 152 may first be received by inline network tap 156 (via port 160). However, since the network environment is in a secondary mode, the data traffic is then routed out of network tap 156 (via port 166) to secondary inline network tap 176 (via port 180). From there, the data traffic is routed to IPS 178 via a port 182. Data traffic is then routed back to secondary inline network tap 176 via a port 184 before routing the data traffic onward to network device 154 via port 186.

Unfortunately, the switch between a normal mode to a secondary mode does not usually provides a continual secured environment. In an example, if IPS 158 is considered to be in a failed state, a notification may be sent to an operator and the data traffic may then be routed through a different path that does not include IPS 158. For example, data traffic may flow from port 160 out through port 166 to port 180 and out through port 186. The data traffic does not automatically flow through IPS 178 without a signal first being sent to activate IPS 178. In other words, until the signal is received to activate IPS 178, the data traffic that is flowing through the network is unsecured.

The unsecured environment may exist from a few seconds up to a few hours depending upon the time required to activate IPS 178. In an example, if IPS 178 is being activated via a signal (through an algorithm, for example), the network environment may only be unsecured for a few seconds. However, if the IPS 178 is required to be manually activated, the network environment may remain unsecured until a person is able to manually activate IPS 178.

Regardless, during the time the network is unsecured, sensitive data is unprotected and may be exposed to external attack and/or unauthorized access. Thus, even though a company may spend hundreds of thousands of dollars to millions of dollars (the cost of a monitoring/security system may range from about 100 thousands to 500 thousands dollars per unit) to create and maintain a secure network, the company's network environment may not always be secured. In addition, if by chance both IPSs fail to function properly, the network is essentially unsecured and/or unavailable until one or both IPSs can be repaired and/or replaced.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 1A shows a simple block diagram of a network environment.

FIG. 4B shows, in an embodiment of the invention, examples of diagnostic test conditions.

FIG. 5 shows, in an embodiment of the invention, examples of different failure conditions that may be established to determine when a monitoring system is not functioning properly.

FIG. 11 shows, in an embodiment of the invention, examples of different paths available for directing traffic through a secured network.

DETAILED DESCRIPTION OF EMBODIMENTS

Figure 1B:
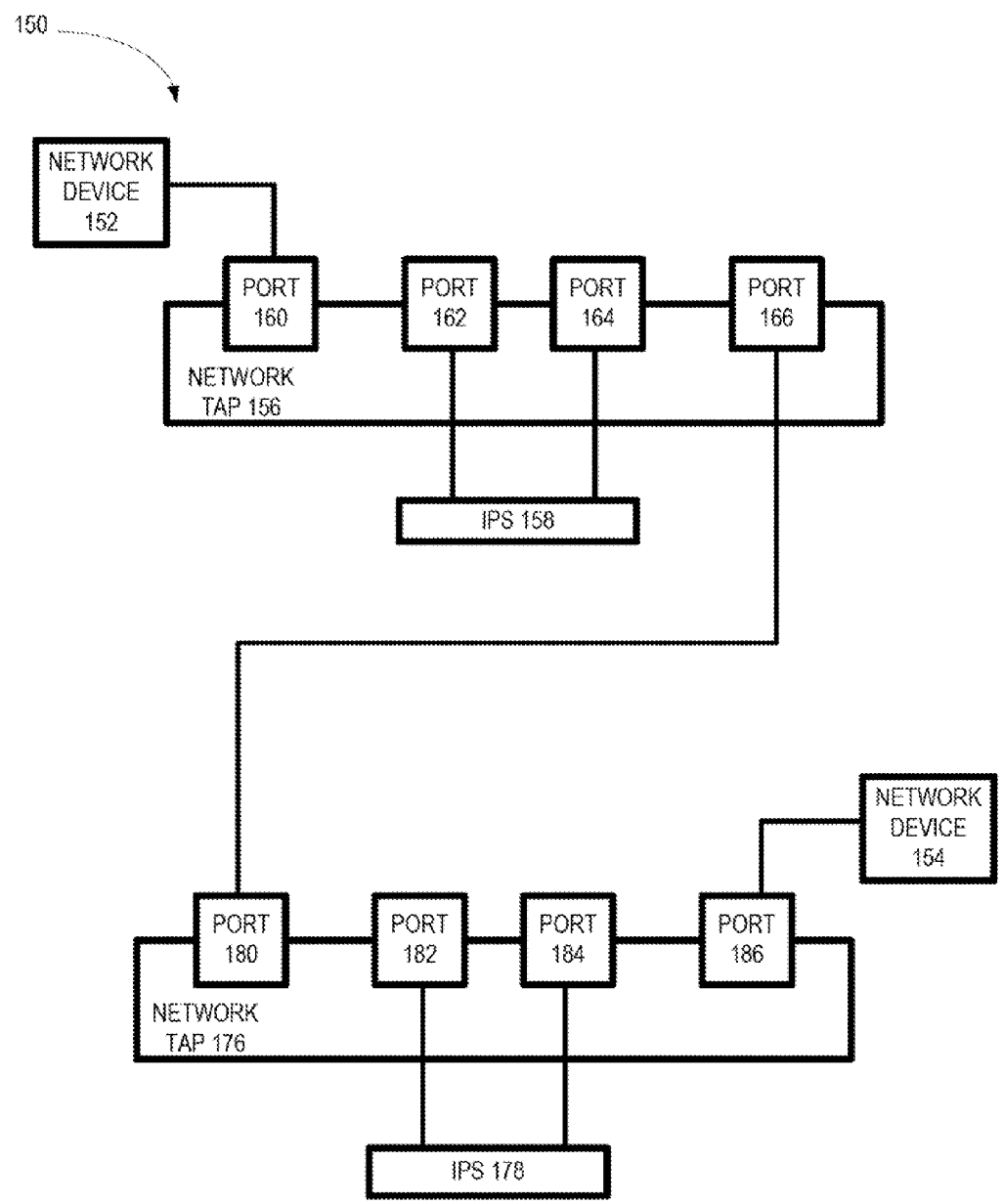
FIG. 1B shows a simple block diagram of a highly available secured network environment.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide examples of different mode of practicing the invention. The description is not meant to be limiting. For example, reference is made to network traffic and packets, while other forms of data and addresses can be used in the invention. The invention is applicable to both wire and optical technologies. In addition, even though the invention may be described using an inline tap example, the invention is not limited to an inline device and may include programmable logic for performing inline and/or span functions.

In accordance with embodiments of the present invention, arrangements and methods are provided for managing an integrated secured network environment. Embodiments of the invention include methods for determining the condition of an inline monitoring/security system. Embodiments of the invention also provide for a streamline arrangement for automatically switching between inline monitoring/security systems. Embodiments of the invention further provide for a streamline arrangement for providing alternative paths for providing access to the networks. Embodiments of the invention yet also include a dual bypass module for securing data traffic flowing through a network while providing access to the network. Embodiments of the invention yet further include a high density network device (hereinafter known as iBypass high density device) for providing an integrated single high density device for sharing network resources across multiple network arrangements.

In an embodiment of the invention, a dual bypass module is provided for protecting data traffic flowing through a network while providing access to the network. In an embodiment, the dual bypass module may include a logic arrangement (such as a field-programmable gate array (FPGA)) for managing the data traffic. In an embodiment, the FPGA may include a logic arrangement (such as an algorithm) for determining the condition of one or more monitoring systems (such as intrusion prevention systems, intrusion detection systems, firewalls, packet sniffers, and the like). FPGA may also include a logic arrangement (such as an algorithm) for providing an automatic arrangement for switching between monitoring systems, in an embodiment. Further, FPGA may also include, in an embodiment, a logic arrangement (such as an algorithm) for providing secured alternative paths for providing access to the network.

In an embodiment of the invention, arrangements and methods are provided for determining the condition of a monitoring system (such as an intrusion prevention system, an intrusion detection system, a firewall arrangement, a packet sniffer, and the like). In the prior art, a diagnostic test includes the transmission of a single heartbeat packet that is configured to test the condition of the path between the network tap and the monitoring system. In an embodiment of the invention, a sequential heartbeat diagnostic test is provided for identifying conditions that may cause a component, such as the monitoring system, to be faulty.

Unlike the prior art, a sequential heartbeat diagnostic test is configured to send one or more sets of sequential heartbeat packets to determine the state of a monitoring system. Each set of sequential heartbeat packets may be configured to test different conditions/operation/state of a monitoring system. In an example, a sequential heartbeat diagnostic test may include three set of sequential heartbeat packets with the first set of sequential heartbeat packets being configured to test the TCP (transmission control protocol) session, the second set of sequential heartbeat packets being configured to test the first security policy of a monitoring system, and the third set of sequential heartbeat packets being configured to test the second security policy of the monitoring system. As can be appreciated from the foregoing, the number of heartbeat packets and the number of set of sequential heartbeat packets being sent in a sequential heartbeat diagnostic test may vary depending upon the conditions being tested.

In an embodiment of the invention, a counter may be associated with each diagnostic test condition. Each counter may be independent of one another and may be defined by different counter rules. In an example, one counter rule may require a counter to be increased and decreased by one increment each time a heartbeat packet is sent and received, respectively. In another example, another counter rule may require a counter to be increased by one and reset to zero each time a heartbeat packet is sent and received, respectively.

With a sequential heartbeat diagnostic test, an algorithm may be provided to simulate real world conditions in order to determine the true state of a monitoring system. Given the flexibility of the sequential heartbeat diagnostic test, a company can configure the diagnostic test to specifically test the conditions that have the most impact on its network.

In an embodiment of the invention, arrangements and methods may be provided for automatically switching between inline monitoring/security systems. In the prior art, the high availability network may include two network arrangements coupled together with each network arrangement having its own monitoring system. Unlike the prior art, an arrangement is provided in which the streamlined high availability secured network is incorporated within a single device, in an embodiment. As a result, the cost associated with establishing and maintaining two network arrangements is reduced. Since, the data path is now only flowing through one network arrangement, the path is shorter, thereby reducing the latency in the data path between two network devices, and also reducing the signal attenuation (light loss) when the medium is optical fiber. In addition, since the switch between monitoring system is managed by a single logic component (such as an FPGA), the switch is automatic. In other word, if the primary monitoring system is offline, the FPGA immediately redirect data traffic through the secondary monitoring system.

In an embodiment of the invention, arrangements and methods are provided for providing secured alternative paths through the network, thereby providing network access to legitimate users. In the prior art, two independent parallel network arrangements may be provided for handling data traffic through the network. However, since each network arrangement is independent of another, the two network arrangements are unable to share resources. Thus, each network arrangement is coupled to its own monitoring arrangement in order to provide a secured network environment for the data traffic flowing through the network.

Unlike the prior art, a redundant secured link arrangement is provided in which parallel paths (e.g., communication path) are provided through the same network arrangement. In an example, two set of network ports are provided for receiving and transmitting data traffic through the network. The first set of network ports may be designated as the primary path while the second set of network ports may be designated as the secondary path. In an embodiment, the two set of network ports may share the same monitoring arrangement. Thus, the cost of establishing and maintaining a monitoring system for each set of network ports may be reduced.

In an embodiment, the arrangement of the dual bypass module enables the sharing of resources. In the prior art, in order to make each path a secured high availability path, each path may be connected to two monitoring systems. In the above example, when the primary monitoring system of the primary path goes offline, the primary path is protected by the secondary monitoring system. Thereby providing a secured network environment. However, the cost of making each path secure can become expensive. In an example, with two parallel paths through the network, four monitoring systems (each at the cost of at least one hundred thousand dollars) may be required.

Unlike the prior art, with the dual bypass module, resources (such as a monitoring system) may be shared. In an example, instead of four monitoring systems, the dual bypass module may only require two monitoring systems to provide a high availability secured network arrangement with parallel paths through the network. Thus, cost may be reduced while maintaining a high level of security for the data traffic flowing through the network.

In an embodiment, an iBypass high density device may be provided to manage resources across a multiple networks environment. The iBypass high density device may include a plurality of network interfaces. Each network interface may be configured to couple with a network arrangement (such as a dual bypass module). In an example, if iBypass high density device includes four network interfaces, the iBypass high density device may be able to support four network arrangements.

In an embodiment, data path may exist between a pair of network interfaces. In an example, a data path may exist between a first network interface and a second network interface. By providing a data path between the network interfaces, resources available on each of the network arrangements may be shared. In an example, data traffic flowing through a first network arrangement may share the monitoring systems associated with the second network arrangement if the monitoring systems associated with the first network arrangement are offline.

In an embodiment, iBypass high density device may include a logic component (such as an FPGA). The FPGA may be configured to manage the network arrangements coupled to the iBypass high density device. In an example, common updates across network arrangements may be consolidated and handled by a single logic component (FPGA of the iBypass high density device). In another example, data traffic flowing through the network may be rerouted by the FPGA if one or more network arrangements is/are experiencing problems.

The features and advantages of the present invention may be better understood with reference to the figures and discussions that follow.

Figure 2:
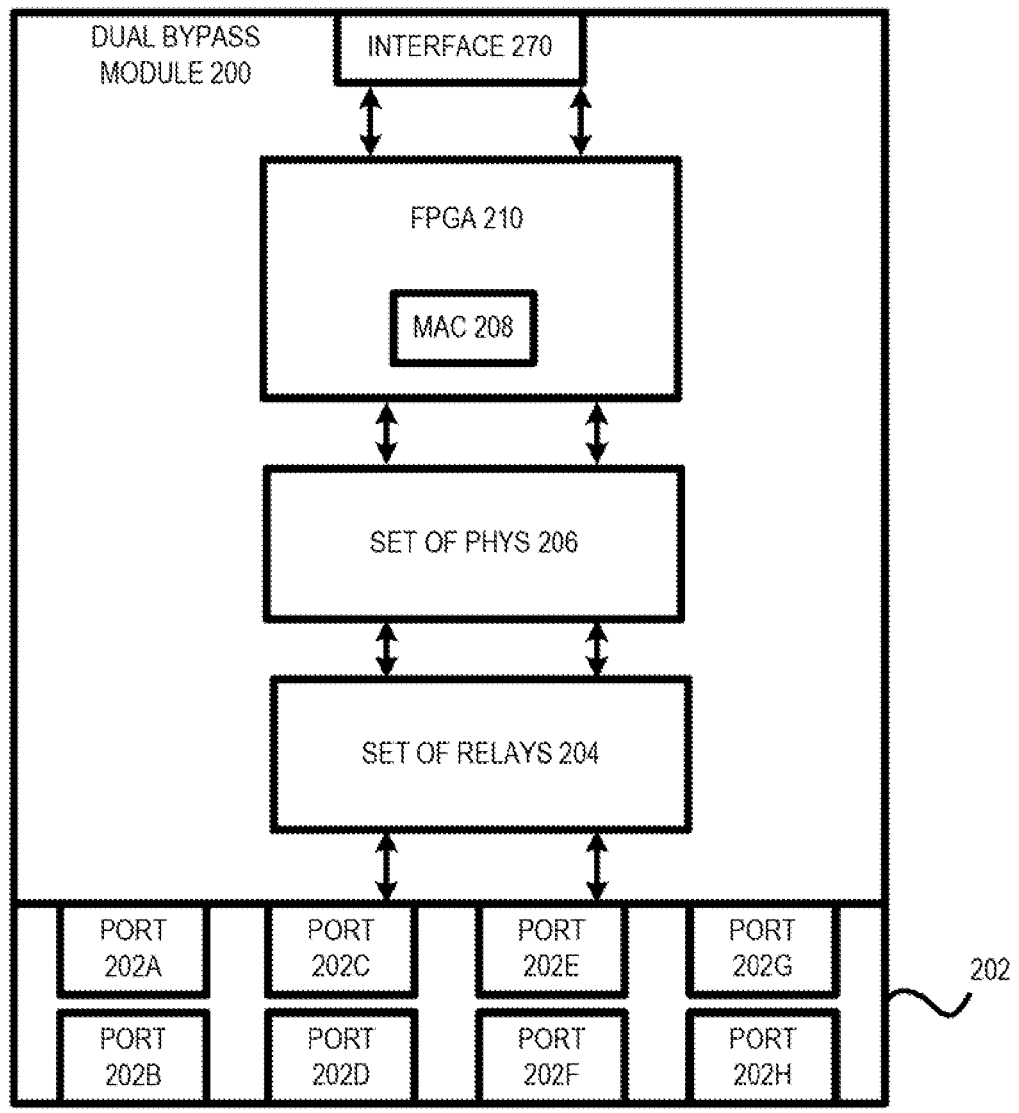
FIG. 2 shows, in an embodiment of the invention, a simple block diagram of a dual bypass module.

FIG. 2 shows, in an embodiment of the invention, a simple block diagram of a dual bypass module 200. Dual bypass module 200 may include a front interface 202. Front interface 202 may include a set of ports, including ports 202A, 202B, 202C, 202D, 202E, 202F, 202G, and 202H. Ports 202A-202D may be network ports configured to receive and transmit data traffic between a first network device and a second network device. Ports 202E-202H may be monitored ports configured to interact with monitoring/security systems (such as intrusion prevention systems, intrusion detection systems, firewall arrangements, and the like).

In an embodiment, dual bypass module 200 may include a set of relays 204. Set of relays 204 may be employed to control the flow of data through dual bypass module 200. In an example, power may be flowing through dual bypass module 200 to provide the necessary power for managing the data traffic flowing through dual bypass module 200. However, if power is not available, set of relays 204 may be employed to create an alternate path for routing data traffic through dual bypass module 200. Thus, data traffic is not disrupted even if power is not available to enable dual bypass module to perform its monitoring/security function.

In an embodiment, dual bypass module 200 may include a set of physical layers (PHYs) 206. As discussed herein, a PHY refers to an integrated circuit that may be employed to interface with a set of media access controller (MAC) 208. In an embodiment, MAC 208 may be embedded within a configurable integrated circuit, such as a field-programmable gate array (FPGA) 210.

In an embodiment, FPGA 210 may be managed from a number of device structures via several managing device interfaces. For example, FPGA 210 may be configured over a command line interface, a web based device, system interface (such as an SNMP interface) and the like. Each of these interfaces may provide local as well as remote control of the network arrangement. Communication protocols for these interfaces are generally well-known in the art and may be utilized without limitation and without departing from the present invention.

In an embodiment, FPGA 210 may be configured to include a logic arrangement (such as an algorithm) for determining the condition of an inline monitoring system (e.g. an intrusion prevention system, a firewall system, etc.). In an embodiment, the algorithm may be a programmable and/or hard logic. In an embodiment, the algorithm may be part of a single heartbeat diagnostic test, which is well-known in the prior art. In another embodiment, the algorithm may be part of a sequential heartbeat diagnostic test. Discussion about the single heartbeat diagnostic test and the sequential heartbeat diagnostic test is also disclosed in a related application entitled "Sequential Heartbeat Packet Arrangement and Methods Thereof," filed herewith by Matityahu et al. Ser. No. 61/308,867, all of which are incorporated herein by reference.

Figure 3:
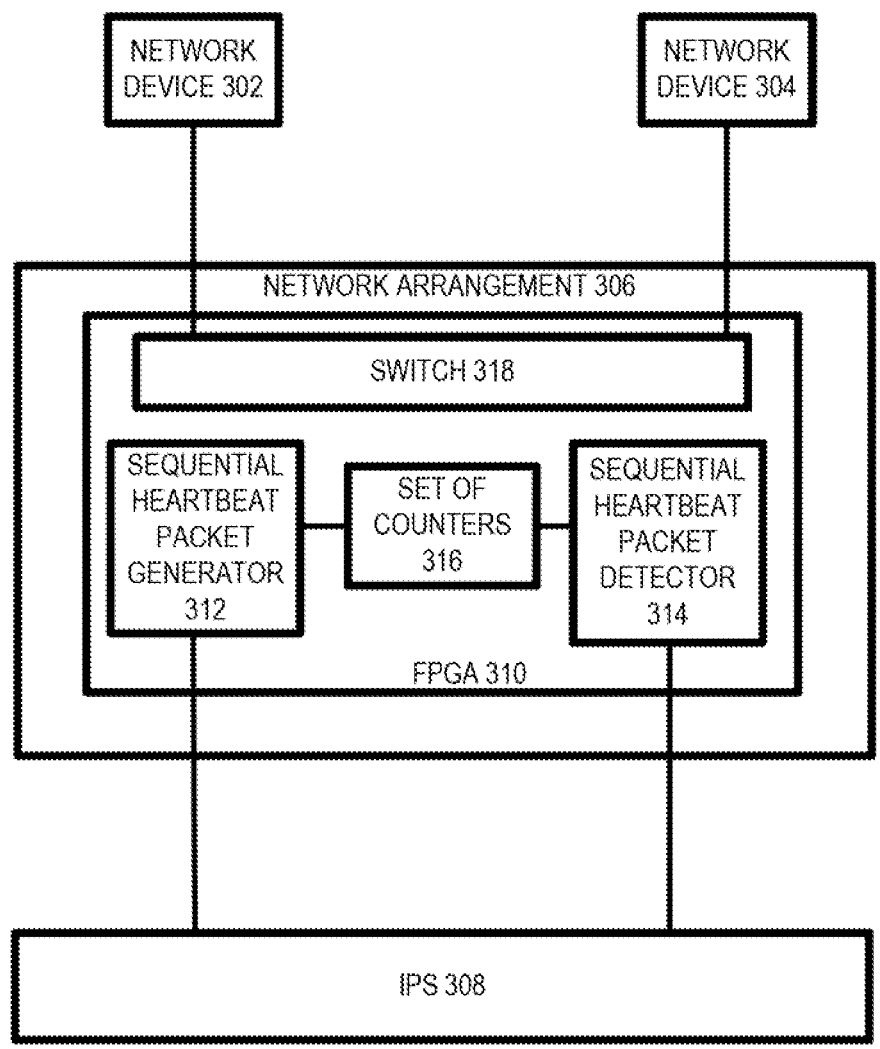
FIG. 3 shows, in an embodiment of the invention a simple block diagram of a secured network environment.

FIG. 3 shows, in an embodiment of the invention a simple block diagram of a secured network environment. The network may include a plurality of network devices (including network devices 302 and 304). These network devices may include, but are not limited to switches, routers, server computers, client computers, and so forth. A network arrangement 306 (such as a dual bypass module) may be disposed in-line between the two network devices and may be configured to communicate bi-directionally with each of the network devices. Network arrangement 306 may also be coupled to a monitoring system, such as an IPS 308.

To ensure the network integrity, a sequential heartbeat diagnostic test may be executed. In an embodiment, network arrangement 306 may include a logic component, such as a field-programmable gate array (FPGA) 310, which may execute a sequential heartbeat diagnostic test. In an embodiment, FPGA 310 may include a sequential heartbeat packet generator 312 for generating and inserting the heartbeat packets into the network data traffic flowing to the monitoring system (IPS 308). FPGA 310, in an embodiment, may also include a sequential heartbeat packet detector 314, which may be configured to identify and remove the heartbeat packet from the data traffic when the heartbeat packet returns from the monitoring system (IPS 308).

In an embodiment, FPGA 310 may also include a set of counters 316. Each counter may be associated with a diagnostic test condition. As discussed herein, a diagnostic test condition refers to a test condition associated with the monitoring system that may be tested through a heartbeat packet.

In an embodiment, FPGA 310 may also include a switch 318. Switch 318 may be employed to switch network arrangement 306 from a normal mode (a mode in which the data traffic is being protected by a monitoring system) to a bypass mode (a mode in which the data traffic is being routed through a path that is not secured).

In an embodiment the FPGA 310 may be user configurable, thereby enabling the parameters associated with a sequential heartbeat diagnostic test to be tailored. In an example, the user may define the time interval for generating and sending a heartbeat packet. In another example, the user may define the fault conditions.

Figure 4A:
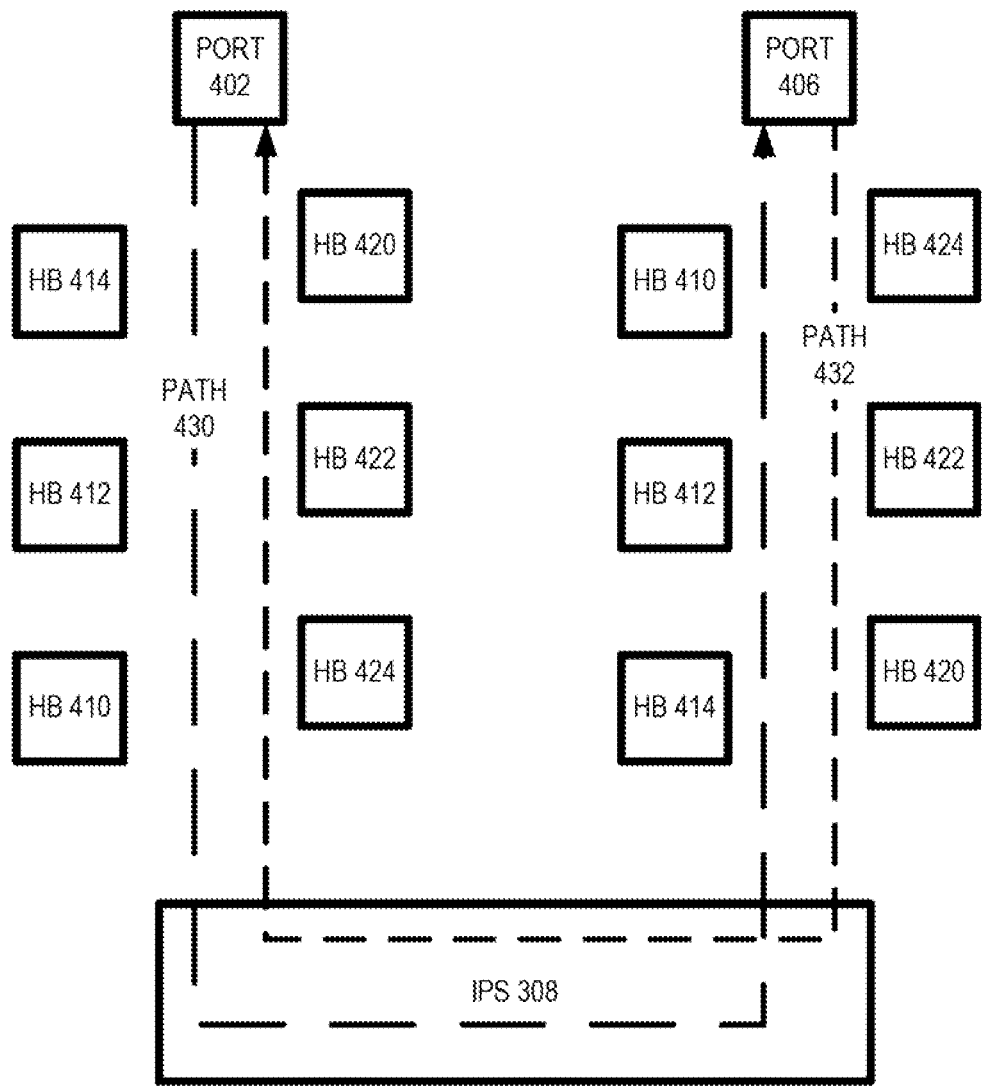
FIG. 4A shows, in an embodiment of the invention, a simple logic block diagram for a sequential heartbeat diagnostic test.

FIG. 4A shows, in an embodiment of the invention, a simple logic block diagram for a sequential heartbeat diagnostic test. Consider the situation wherein, for example, data traffic may be flowing through inline network arrangement 306, such as a dual bypass module. In other words, data traffic may be flowing out of port 402 through an inline monitoring system (such as IPS 308) back through port 406 before being transmitted onward.

To determine the condition of the inline monitoring system, a sequential heartbeat diagnostic test may be executed. Unlike the prior art, the sequential heartbeat diagnostic test is not designed merely to test the data path between network arrangement 306 and IPS 308. Instead, the sequential heartbeat diagnostic test may be configured to simulate different real world conditions that data traffic may experience flowing through a secured network environment.

Consider the situation wherein, for example, a sequential diagnostic test is configured to test three real-world conditions (as shown in FIG. 4B): simulate TCP session between the network arrangement and IPS 308 (condition 450), simulate condition for a first security policy (condition 452), and simulate condition for a second security policy (condition 454). To perform the test, sequential heartbeat packet generator 312 may generate sets of sequential heartbeat packets (HB 410, HB 412, and HB 414) and may insert the sets of sequential heartbeat packets into the network data traffic flowing to IPS 308. As mentioned above, the number of heartbeat packets and the number of set of sequential heartbeat packets being sent in a sequential heartbeat diagnostic test may vary depending upon the conditions being tested. For example, each set of sequential heartbeat packets may be configured to test different conditions/operation/state of the monitoring system. In an example, HB 410 may be configured to simulate the TCP session, HB 412 may be configured to simulate the first security policy and HB 414 may be configured to simulate the second security policy.

In an embodiment, more than one sequential heartbeat diagnostic test may be performed. In an example, the diagnostic test conditions for data traffic flowing from port 402 to port 406 (path 430) may differ from the diagnostic test conditions for data traffic flowing in the reverse direction (path 432). For example, data traffic flowing from port 402 to port 406 may relate to data being uploaded to the company's intranet while data traffic flowing from port 406 to port 402 may relate to data being downloaded from the company's intranet. As a result, the diagnostic test condition for path 430 may focus on preventing malware attack while diagnostic test condition for path 432 may focus on preventing information leak. Accordingly, the sequential heartbeat diagnostic test may be configured to best fit the monitoring system being tested.

In an embodiment, the time interval between transmitting a set of sequential heartbeat packets may vary depending upon each diagnostic test condition. In an example, each diagnostic test condition for path 430 may require a set of sequential heartbeat packets to be sent every one second. In another example, each diagnostic test condition for path 432 may require a set of sequential heartbeat packets to be sent at different intervals. For example, condition 480 (simulating a TCP session) may require a set of sequential heartbeat packets to be sent every one second while the condition 482 and condition 484 (simulating the third security policy and fourth security policy, respectively) may require a set of sequential heartbeat packets to be sent every two seconds.

Figure 4C:
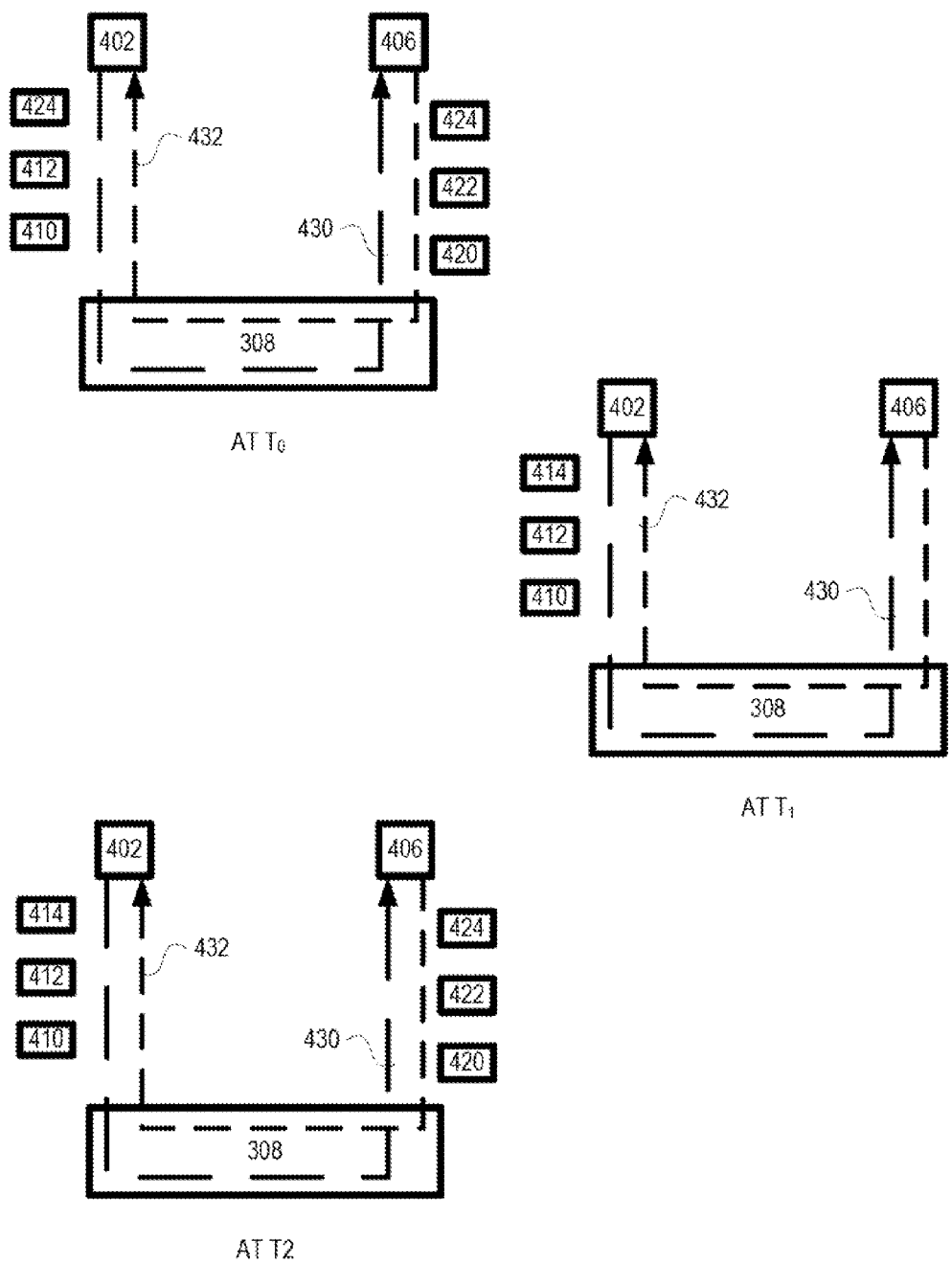
FIG. 4C shows, in an embodiment of the invention, examples of different flow paths at different time intervals.

To illustrate, FIG. 4C shows two different flow paths at different time intervals. At $t_0$, three set of sequential heartbeat packets (HB 410, HB 412, and HB 414) are sent along path 430 and three set or sequential heartbeat packets (HB 420, HB 422, and HB 424) are sent along path 432. One second later, at $t_1$, no heartbeat packets are being sent along path 432 while three set of sequential heartbeat packets continue to be sent along path 430. However, at $t_2$, both paths (430 and 432) are transmitting three set of sequential heartbeat packets each. Accordingly, the number of set of sequential heartbeat packets being transmitted may vary depending upon the time parameter that may have been defined by a user.

In an embodiment of the invention, a counter may be associated with each diagnostic test condition. In an example, counter 460 is associated with condition 450, counter 462 is associated with condition 452, and counter 464 is associated with condition 454. In an embodiment, each counter may be defined by different rules. In an example, counter 462 may be configured to increase by one when sequential heartbeat packet generator 312 generates a set of sequential heartbeat packets and inserts the set of sequential heartbeat packets into the network data traffic being sent to IPS 308. Also counter 462 is configured to be decreased by one when sequential heartbeat packet detector 314 detects the incoming set of sequential heartbeat packets (counter rule 492). In another example, counter 460 may be configured to increase by one when a set of sequential heartbeat packets is sent and may be reset to zero when the set of sequential heartbeat packets is received back by the network tap (counter rule 490).

As can be appreciated from the foregoing, the sequential heartbeat diagnostic test can become a complex test that may be employed to test different real-world conditions that may be faced by a company. FIG. 5 shows, in an embodiment of the invention, examples of different failure conditions that may be established to determine when a monitoring system (such as IPS 208) is not functioning properly. In an example, a failure condition may exist if the number of set of sequential heartbeat packets sent that are associated with one counter is greater than a predefined threshold (failure condition 502). For example, three set of consecutive sequential heartbeat packets have been sent for condition 450; however, no set of sequential heartbeat packets has been transmitted back to sequential heartbeat packet detector. In another example, a failure condition may exist if the total number of sets of sequential heartbeat packets for all counters is above a predefined threshold (failure condition 504). For example, if the number of set of sequential heartbeat packets is greater than six than a failure condition exists.

In an embodiment, an event is triggered when a failure condition exists. The event that is associated with a failure condition may vary. In an example, if failure condition 502 exists, the network tap may be switched from a normal mode to a bypass mode and a warning may be sent to the operator (event 550). In another example, if failure condition 504 exists, the network tap may be switched to a bypass mode and notification may be sent to the operator and the administrator (event 552). Accordingly, the type of event that is triggered, as can be appreciated from the foregoing, may depend upon the severity of the failure condition.

Figure 6:
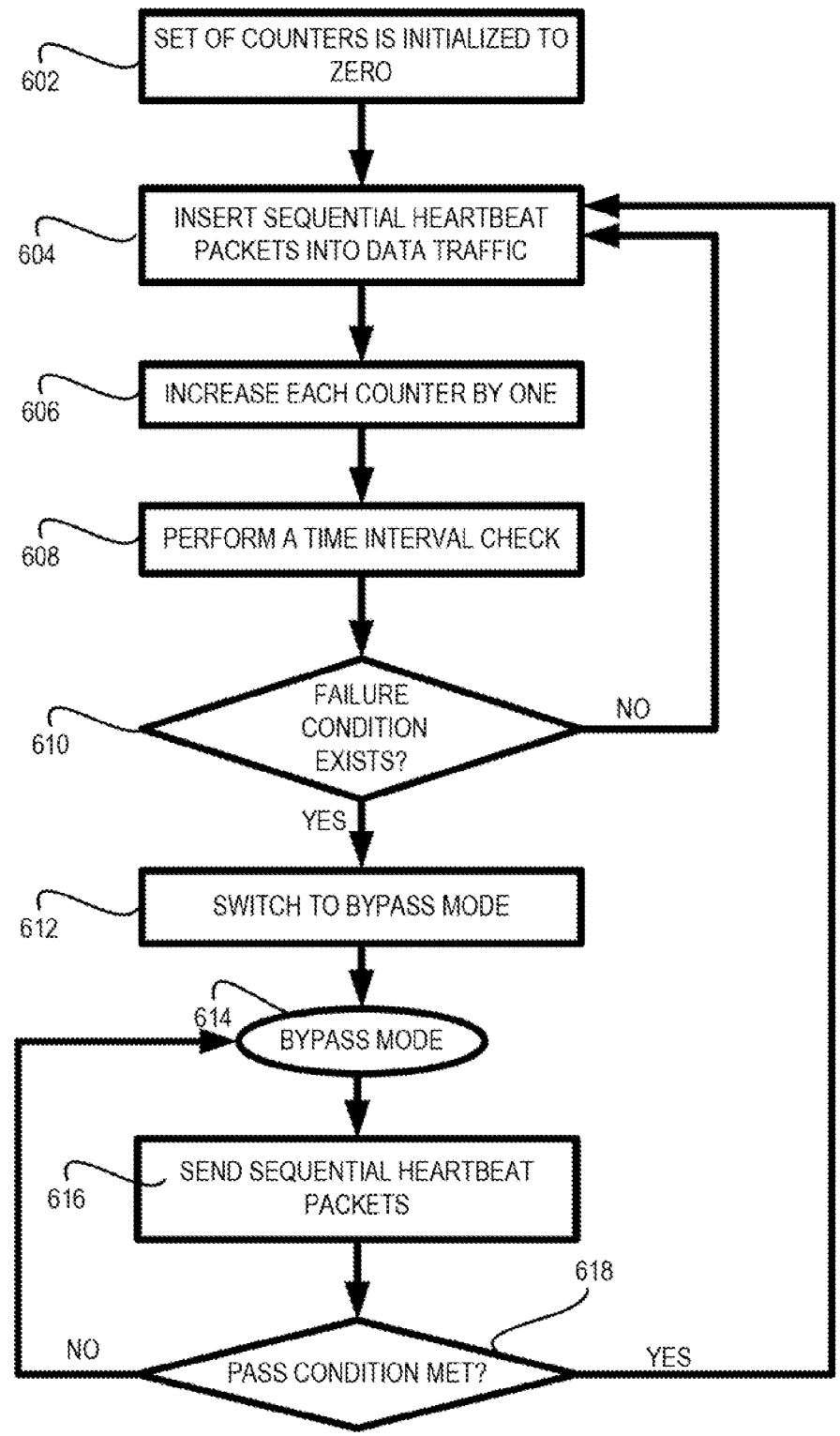
FIG. 6 shows, in an embodiment of the invention, a simple flow chart illustrating a method for implementing a sequential heartbeat diagnostic test.

FIG. 6 shows, in an embodiment of the invention, a flow chart illustrating a method for implementing a sequential heartbeat diagnostic test.

At a first step 602, a set of counters may be initialized to zero. As aforementioned, the number of counters may depend upon the number of diagnostic test conditions. In this example, assume that conditions 450, 452, and 454 are being tested for path 430 and conditions 480, 482, and 484 are being tested for path 432.

At a next step 604, a plurality of a set of sequential heartbeat packet may be inserted into the data traffic and may be sent to IPS 308. In an embodiment, the sequential heartbeat diagnostic test is a dual test. In other words, a diagnostic test may be performed along path 430 and path 432. In this example, at $t_0$, a set of sequential heartbeat packets is sent for each diagnostic test condition. For example, HB 410, HB 412, and HB 414 are being transmitted along path 430 while HB 420, HB 422, and HB 424 are being transmitted along path 432.

At a next step 606, the counter associate with each diagnostic test condition may be incremented by one. In an example, each of the counter (counters 460, 462, 464, 466, 468, and 470) may be set to one.

At a next step 608, the system may perform a time interval check. If a predefined time interval has passed, another set of sequential heartbeat packets may be sent. In an example, one second has passed. As a result, another set of sequential heartbeat packets is sent for conditions 450-454 but no set of sequential heartbeat packets may be sent for conditions 480, 482 and 484.

At a next step 610, the system makes a determination if a failure condition exists. As can be seen from FIG. 5, the number of failure conditions may vary depending upon a user's configuration. In an example, a financial firm may have more stringent failure conditions than a community network since more sensitive data may be flowing through the financial network.

If a fail condition does not exist, the system returns to step 604 to continue the sequential heartbeat diagnostic test. However, if a fail condition exists, the system may trigger one or more events, at a next step 612. In an example, the network tap may switch from a normal mode to a bypass mode. In another example, notification may be sent to the operator/administrator. The event(s) that may be triggered may depend upon the severity of the failure condition and may be defined by the user.

Steps 608 and 610 are not sequential. In other words, step 608 does not have to occur before step 610 can be executed.

Even if the network tap is in a bypass mode (state 614), set of sequential heartbeat packets may continue to be sent (step 616) by the network tap, in an embodiment. Once the monitoring system (such as IPS 308) is connected back to the network tap, the network tap is switched back to a normal state when the failure condition is no longer valid.

In this document, various implementations may be discussed using an intrusion prevention system, as an example. This invention, however, is not limited to an intrusion prevention system and may include any monitoring and/or security arrangement (e.g., firewall, an intrusion detection system, and the like). Instead, the discussions are meant as examples and the invention is not limited by the examples presented.

Further, in this document, various implementations may be discussed using a network tap, as an example. This invention, however, is not limited to a network tap and may include any network device (e.g., director device, router, switches, iBypass high density device, and the like). Instead, the discussions are meant as examples and the invention is not limited by the examples presented.

As can be appreciated from FIGS. 3-6, a sequential heartbeat diagnostic test may be employed to determine the status of an inline monitoring/security system. By executing a sequential heartbeat diagnostic test, real-world condition simulations may be performed to better analyze the true state of the inline monitoring/security system. Thus, an unsecured condition may be quickly identified and preventive/maintenance measures may be implemented to minimize a firm network to external attack.

Figure 7:
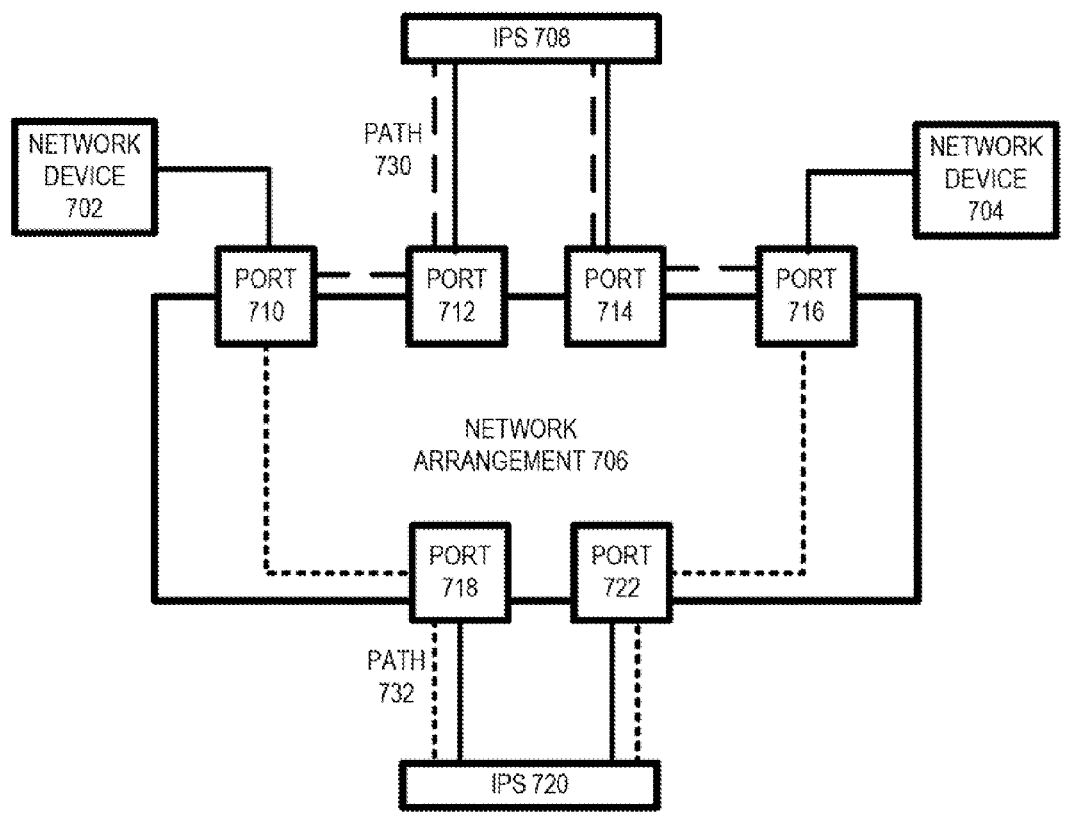
FIG. 7 shows, in an embodiment of the invention, a simple block diagram of a high availability network environment that provides for a redundant secured environment.

In an embodiment, FPGA 210 of FIG. 2 may include logic for providing a high availability secured network environment. FIG. 7 shows, in an embodiment of the invention, a simple block diagram of a high availability network environment that provides for a redundant secured environment. Consider the situation wherein, for example, data traffic is flowing between a network device 702 and a network device 704. An inline network arrangement 706 (such as a dual bypass module) may be configured to monitor data traffic flowing through the network.

Unlike the prior art, the high availability network environment is provided through a single device arrangement. In other words, instead of having two network arrangements with two inline monitoring systems, a high availability network environment may be provided through a single device arrangement. In an example, in a normal mode, data traffic may be flowing through a path 730, which includes flowing from a port 710 out through a port 712 to an inline monitoring/security system (such as IPS 708) then back to inline network arrangement 706 via a port 714 before flowing onward to switch 704 via a port 716. In comparison, the prior art provide for a data path that flows through multiple ports on two different inline network arrangements (156 and 176 of FIG. 1B). Thus, the path is comparatively shorter with a single device arrangement. As a result, the latency and the signal attenuation in fiber network links may be reduced with a single device arrangement.

In an embodiment, an alternate secured path is provided when inline network arrangement 706 is moved to a secondary mode when a diagnostic test (such as a sequential heartbeat diagnostic test) indicates that an inline monitoring/security system (e.g., intrusion prevention system, firewall, etc.) is not functioning properly. In a secondary mode, data traffic may flow through a path 732, which includes flowing from port 710 to a port 718 to a secondary monitoring/security system (such as IPS 720) then flowing back to inline network arrangement 706 via a port 722 before flowing onward to switch 704 via port 716. Even in a secondary mode, the alternate path 732 is relatively shorter than the prior art secondary path of FIG. 1B, thereby reducing the latency and the signal attenuation in fiber network links for data traffic flowing between switches 702 and 704.

Figure 8:
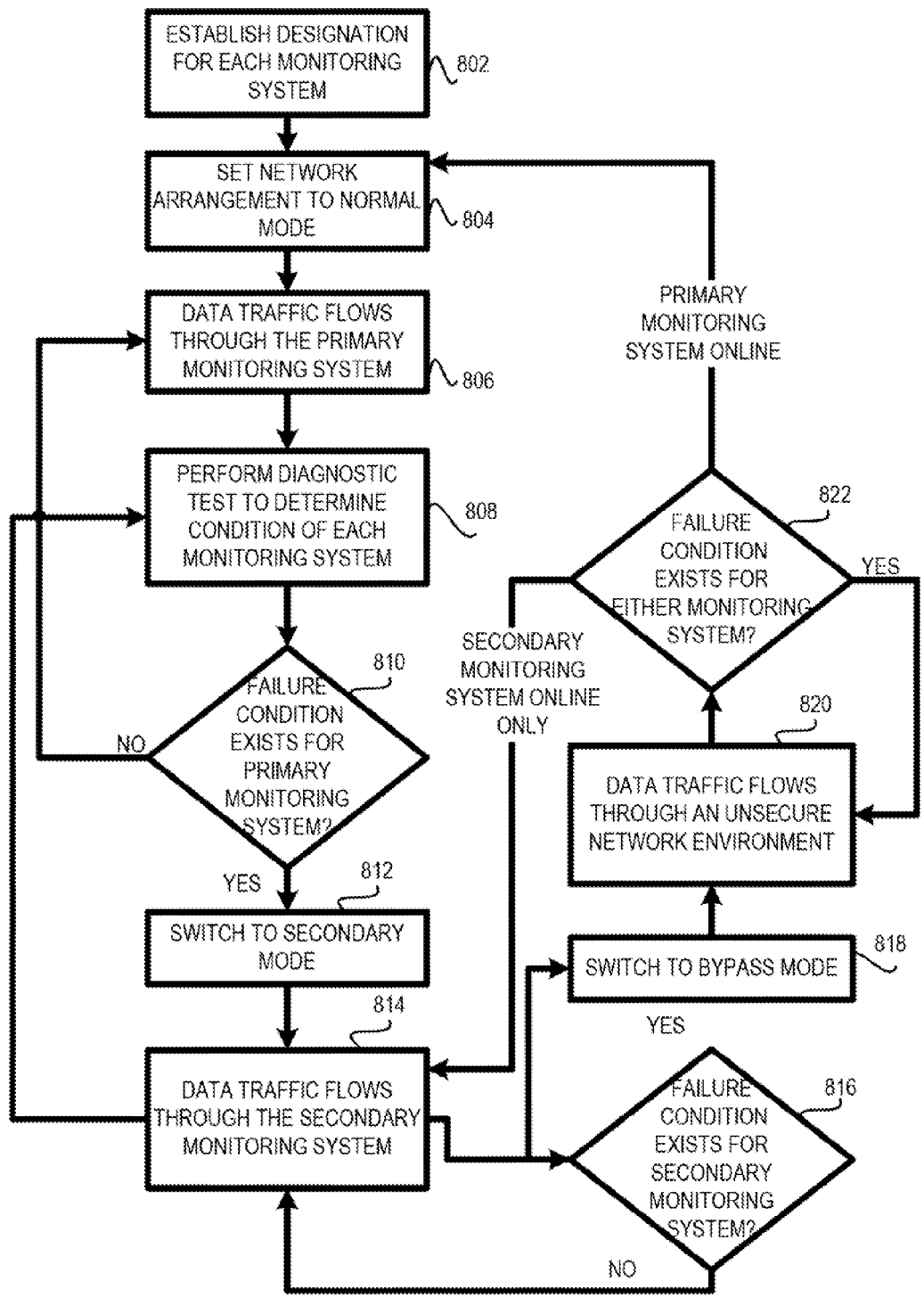
FIG. 8 shows, in an embodiment of the invention, a simple flow chart illustrating a method for implementing a high availability secured network environment.

FIG. 8 shows, in an embodiment of the invention, a simple flow chart for implementing a high availability secured network environment. FIG. 8 will be discussed in relation to FIG. 7.

At a first step 802, an inline monitoring/security arrangements designation is established. In an example, IPS 708 may be set as primary while IPS 720 may be set as secondary. In other words, IPS 720 is passive and is not activated unless the inline network arrangement is set to a bypass mode.

At a next step 804, an inline network arrangement is set to a normal mode. In an embodiment, the inline network arrangement may be a dual bypass module (200).

At a next step 806, data traffic flows through the network via the primary inline monitoring/security arrangement (such as IPS 708).

At a next step 808, a diagnostic test is executed to determine the condition of each inline monitoring/security arrangement (such as IPS 708 and 720). In an embodiment, the diagnostic test may be a single heartbeat diagnostic test. In another embodiment, the diagnostic test may be a sequential heartbeat diagnostic test.

At a next step 810, the system makes a determination about the failure condition of the primary inline monitoring/security arrangement (e.g., IPS 708). If the diagnostic test indicates that the primary inline monitoring/security arrangement is functioning properly, then the system returns to step 806 to continue monitoring data traffic flowing through the primary inline monitoring/security arrangement.

However, if the diagnostic test indicates that the primary inline monitoring/security arrangement (e.g., IPS 708) has malfunctioned, then at a next step 812, the inline network arrangement is switched to a secondary mode and the data traffic is routed through the secondary inline monitoring/security arrangement (step 814).

While data traffic is flowing through the secondary monitoring system, the system continues to perform the diagnostic test on the primary monitory system (step 808). If the primary inline monitoring/security arrangement remains offline, the system continues to route data traffic through the secondary inline monitoring/security arrangement (step 814).

However, if the diagnostic test indicates that the primary inline monitoring/security arrangement is working properly, the system may change the inline network arrangement back to a normal mode (step 804) and data traffic may be routed through the primary monitoring system (step 806).

Since a diagnostic test is being performed for each inline monitoring/security arrangement, at a next step 816, the system also makes a determination on the condition of the secondary inline monitoring/security arrangement. If the secondary inline monitoring/security arrangement is working properly, data traffic continues to be routed through the secondary inline monitoring/security arrangement (step 814).

However, if secondary inline monitoring/security arrangement is offline, the network arrangement may be switched to a bypass mode (step 818). In other words, data traffic is now being routed through an unsecured network environment since both inline monitoring/security arrangements are offline (step 820).

At a next step 822, the system makes a determination about the condition or each inline monitoring/security arrangement. If both inline monitoring/security arrangements continue to be offline, the system continues sending data traffic through an unsecured network (step 820).

However, if either the primary or the secondary inline monitoring/security arrangement is online, then the system switches out of the bypass mode (step 804) and return to step 806 (primary inline monitoring/security arrangement is online) or return to step 814 (secondary inline monitoring/security arrangement is online).

As can be appreciated from FIGS. 7 and 8, a high availability secured network environment with a single device arrangement is a streamline arrangement that is less costly than the prior art arrangement. With only a single device arrangement, less physical space is required to house the network arrangement. Also, the cost of maintaining the high availability secured network arrangement is substantially less since less hardware components are required to be maintained. Further, the delay experienced in the prior art when a primary monitoring system goes offline is substantially eliminated since the FPGA may be configured to immediately reroute the data traffic through a secondary monitoring system in order to provide protection for the data traffic flowing through the network.

In an embodiment of the invention, FPGA 210 of FIG. 2 may also be configured to provide an algorithm for maintaining a redundant path arrangement. As aforementioned, a path through a network may sometime become unavailable or may become congested. To ensure accessibility to its network, a company may implement a redundant link/path arrangement.

Figure 9:
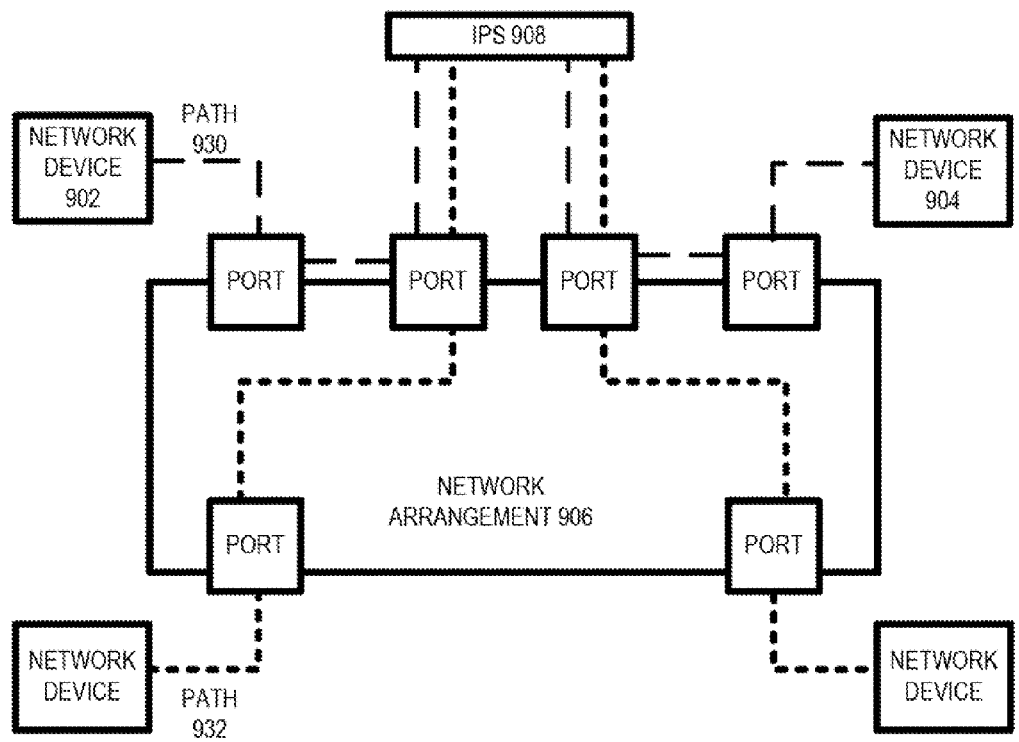
FIG. 9 shows, in an embodiment of the invention, a simple block diagram illustrating a secured network environment with a redundant path arrangement.

FIG. 9 shows, in an embodiment of the invention, a simple block diagram illustrating a secured network environment with a redundant path arrangement. Unlike the prior art, the redundant path arrangement is achieved without having to employed a duplicate hardware arrangement. In other words, only a single device arrangement is required. In an example, data traffic may flow between network devices (such as network devices 902 and 904) via a path 930. However, if path 930 is unavailable or become congested, data traffic may flow via a path 932 instead. Data traffic may be shifted from path 930 to path 932 by operator intervention, or the network arrangement 906 may automatically change the path when it detects a loss of link on path 930, or other criteria.

Since both paths are flowing through the same inline network arrangement (906), both paths may share a single inline monitoring/security system (such as IPS 908). In other words, instead of spending hundred thousands of dollars in purchasing another inline monitoring/security system to ensure that each path is secured, a single inline monitoring/security system may be employed. Further, the delay experienced in the prior art when a primary path becomes unavailable or congested is substantially eliminated since the FPGA may be configured to immediately reroute the data traffic through a secondary path in order to provide protection for the data traffic flowing through the network.

As can be appreciated from FIG. 9, the redundant link/path arrangement provides a streamlined arrangement for providing multiple paths to ensure the continual accessibility of the network without sacrificing the security of the network. With only a single device arrangement, less physical space is required to house the network arrangement and the cost of maintaining the network may be significantly reduced.

As can be seen from the aforementioned figures, FPGA 210 can become a versatile component with the three functions (i.e., identifying the current condition of the monitoring/security system, providing a high availability secure environment and by providing a redundant path arrangement) integrated into a single logic unit.

Figure 10:
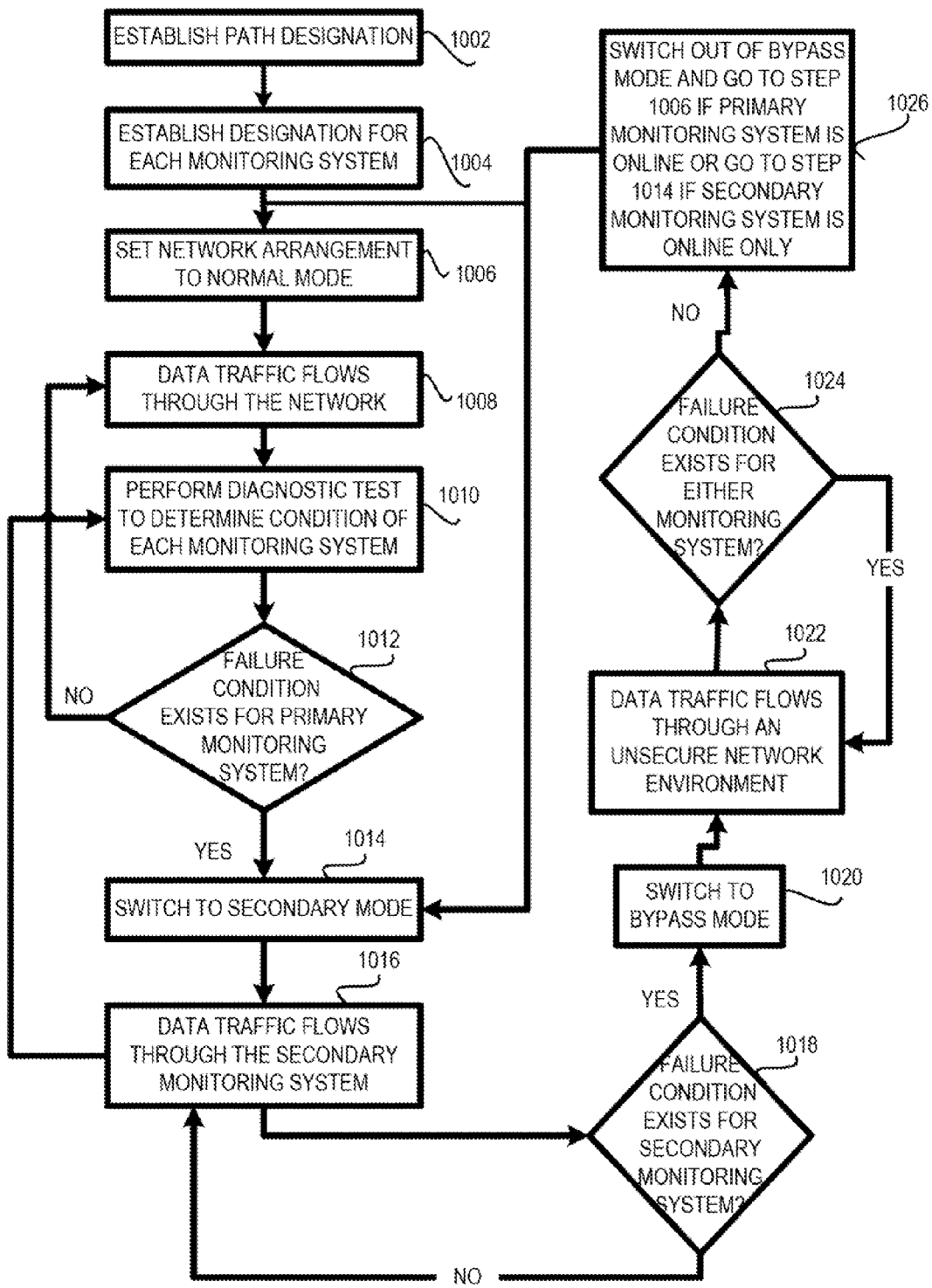
FIG. 10 shows, in an embodiment of the invention, a simple flow chart illustrating a method for implementing all three functions in a single dual bypass module.

FIG. 10 shows, in an embodiment of the invention, a simple flow chart illustrating a method for implementing all three functions in a single dual bypass module. FIG. 10 will be discussed in relation to FIG. 11, which shows examples of different paths available for directing traffic through a secured network.

At a first step 1002, a path designation is established. In an example, data traffic flowing through port 1120 or port 1122 may be designated as primary while data traffic flowing through port 1124 or port 1126 may be designated as secondary. In other words, most data traffic flowing through the network may be flowing through ports 1120 or port 1122. However, if primary ports 1120 and/or 1122 are unavailable or are experiencing congestion, then the data traffic may be diverted to ports 1124 and/or ports 1126, respectively.

At a next step 1004, the inline monitoring/security arrangements designation may be established. In an example, IPS 1110 may be set as primary while IPS 1112 may be set as secondary. In other words, IPS 1112 is passive and is not activated unless IPS 1110 is not functioning properly.

At a next step 1006, an inline network arrangement may be set to a normal mode. In an embodiment, the inline network arrangement may be a dual bypass module.

Note that steps 1002-1006 may be happening at the same time.

At a next step 1008, data traffic flows through the network. In an example, if data traffic is flowing through the primary paths (in a full-duplex network, for example), then FPGA 1104 may direct the data traffic along a path 1140 (port 1120-FPGA 1104-port 1128-IPS 1110-port 1130-FPGA 1104-port 1122) or a path 1142 (port 1122-FPGA 1104-port 1128-IPS 1110-port 1130-FPGA 1104-port 1120). However, if the primary paths are not available or they are congested, then data traffic may be coming from the secondary paths. If the data traffic is coming from the secondary paths, then FPGA 1104 may direct the data traffic along a path 1144 (port 1124-FPGA 1104-port 1128-IPS 1110-port 1130-FPGA 1104-port 1126) or a path 1146 (port 1126-FPGA 1104-port 1128-IPS 1110-port 1130-FPGA 1104-port 1124). Regardless if data traffic is coming from the primary paths or the secondary paths, FPGA 1104 may be configured to send the data traffic through the same IPS (IPS 1110).

At a next step 1010, a diagnostic test may be executed to determine the condition of each inline monitoring/security arrangement (such as IPS 1110 and 1112). In an embodiment, the diagnostic test may be a single heartbeat diagnostic test. In another embodiment, the diagnostic test may be a sequential heartbeat diagnostic test.

At a next step 1012, the system makes a determination about the failure condition of the primary inline monitoring/security arrangement (IPS 1110). If the diagnostic test indicates that the primary inline monitoring/security arrangement (IPS 1110) is functioning properly, then the system returns to step 1008 to continue monitoring data traffic flowing through the primary inline monitoring/security arrangement (IPS 1110).

However, if the diagnostic test indicates that the primary inline monitoring/security arrangement (IPS 1110) has malfunctioned, then at a next step 1014, the inline network arrangement is switched to a secondary mode and the data traffic is routed through the secondary inline monitoring/security arrangement (IPS 1112), at a next step 1016. In other words, data traffic flowing along primary paths may be flowing along a path 1148 (port 1120-FPGA 1104-port 1132-IPS 1112-port 1134-FPGA 1104-port 1122) or a path 1150 (port 1122-FPGA 1104-port 1132-IPS 1112-port 1134-FPGA 1104-port 1120) and data traffic flowing along the secondary paths may be flowing along a path 1152 (port 1124-FPGA 1104-port 1132-IPS 1112-port 1134-FPGA 1104-port 1126) or a path 1154 (port 1126-FPGA 1104-port 1132-IPS 1112-port 1134-FPGA 1104-port 1124). Regardless if data traffic is coming from the primary paths or the secondary paths, FPGA 1104 is configured to send the data traffic through IPS 1112 since IPS 1110 is not available.

While the system is in secondary mode, the system continues to perform a diagnostic test on the primary monitoring system (step 1010) to determine the when the primary inline monitoring/security arrangement (IPS 1110) is online. If the primary inline monitoring/security arrangement (IPS 1110) is offline, the system continues to route data traffic through the secondary inline monitoring/security arrangement (step 1016).

However, if the diagnostic test indicates that the primary inline monitoring/security arrangement (IPS 1110) is working properly, the system may change the inline network arrangement back to a normal mode (step 1006) and the system returns back to step 1008.

Since a diagnostic test is being performed for each inline monitoring/security arrangement, at a next step 1018, the system also makes a determination on the condition of the secondary inline monitoring/security arrangement (IPS 1112). If the secondary inline monitoring/security arrangement (IPS 1112) is working properly, data traffic continues to be routed through the secondary inline monitoring/security arrangement (step 1016) if primary inline monitoring/security arrangement (IPS 1110) is still offline.

However, if both the primary and secondary inline monitoring/security arrangements are offline, the network arrangement may be switched to a bypass mode (step 1020). In other words, data traffic may be routed through an unsecured network environment since both inline monitoring/security arrangements are offline (step 1022). In an example, data traffic flowing along primary paths may be directed through a path 1156 (port 1120-FPGA 1104-port 1122) or a path 1158 (port 1122-FPGA 1104-port 1120) and data traffic flowing along secondary paths may be directed through a path 1160 (port 1124-FPGA 1104-port 1126) or a path 1162 (port 1126-FPGA 1104-port 1124). Regardless if data traffic is coming from the primary paths or the secondary paths, the data traffic is flowing through an unsecured network.

At a next step 1024, the system makes a determination about the condition of each inline monitoring/security arrangement. If both inline monitoring/security arrangements continue to be offline, the system continues sending data traffic through an unsecured network (step 1022).

However, if either the primary or the secondary inline monitoring/security arrangement is online, then the system may switch out of the bypass mode (step 1026) and return to step 1006 (primary inline monitoring/security arrangement is online) or return to step 1014 (secondary inline monitoring/security arrangement is online).

As can be appreciated from the foregoing, data traffic flowing through a dual bypass module may be provided with a secured network environment. By integrating the three functions (i.e., identifying the current condition of the monitoring/security system, providing a high availability secure environment and by providing a redundant path arrangement) the task of establishing and maintaining a secured network environment is streamlined and the cost is minimized while providing the secured network with flexibility in handling the various different scenarios that may arise.

Figure 12A:
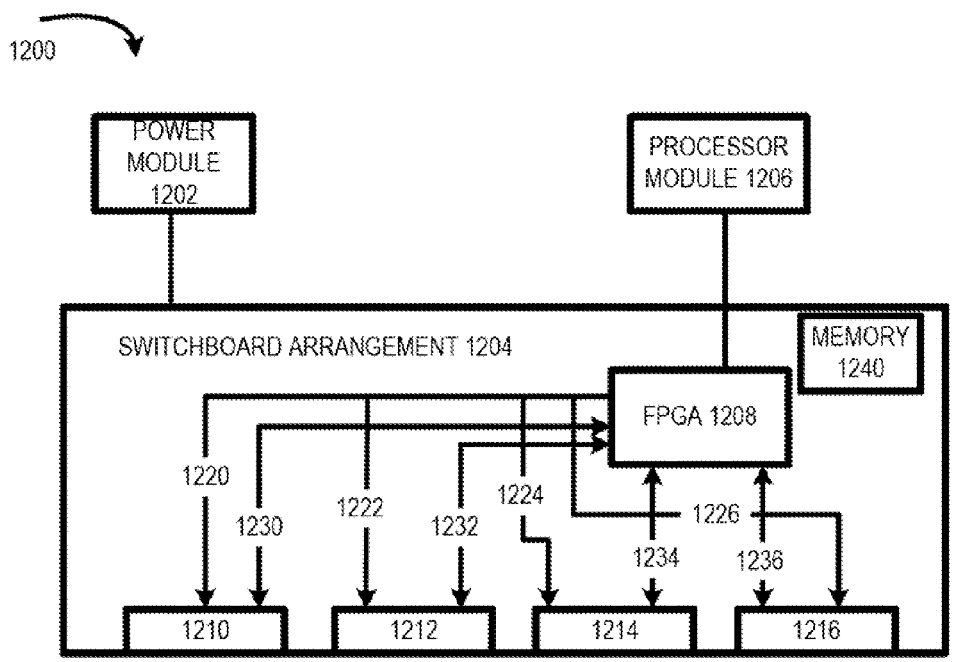
FIGS. 12A and 12B show, in embodiments of the invention, examples of simple logic block diagrams of an iBypass high density device.

To substantially eliminate the potential for an unsecured environment, a high density network arrangement (hereinafter known as an iBypass high density device) is provided for sharing network resources, in an embodiment. To facilitate discussion, FIG. 12A shows, in an embodiment of the invention, a simple logic block diagram of an iBypass high density device.

Similar to most network devices, iBypass high density device 1200 may include a power module 1202, which may be configured at least for providing power to iBypass high density device 1200. Power module 1202 may be configured to couple with a switchboard arrangement 1204 (e.g., CPU) via a set of connectors. Switchboard arrangement 1204 may include a DC (direct current) module for receiving and converting the power received by power module 1202.

Also, iBypass high density device 1200 may include a processor module 1206, which may be configured at least for providing the processing capability to iBypass high density device 1200. Processor module 1206 may be coupled to switchboard arrangement 1204 via a set of bus (e.g., peripheral component interconnected bus), thereby enabling processor module 1206 to communicate with switchboard arrangement 1204.

Switchboard arrangement 1204 may include a logic component, such as an FPGA 1208, which may be capable of managing and processing the data traffic flowing through iBypass high density device 1200. iBypass high density device 1200 may also include a set of network interfaces (1210, 1212, 1214, and 1216). The number of network interfaces may vary depending upon the physical size of iBypass high density device 1200. In an embodiment, each network interface may be configured to couple with an interface of network arrangement. In an example, a dual bypass module (such as dual bypass module 200) may connect to network interface 1210, for example, through its interface 270 (as shown on FIG. 2). In this example, iBypass high density device 1200 is capable of supporting up to four network arrangements.

In an embodiment, FPGA 1208 may be configured to communicate with each network arrangement through a control path (such as control paths 1220, 1222, 1224, and 1226). In an example, FPGA 1208 is able to communicate with dual bypass module 200, for example, when dual bypass module 200 is inserted into network interface 1210. One advantage of different network arrangements being able to communicate with a single logic arrangement (such as FPGA 1208) may include software update or upgrade. In an example, a software update may be handled through FPGA 1208 instead of each individual network arrangement. Another advantage may include accessibility to resources (such as memory 1240) that the network arrangement may not be capable of supporting by itself or may not have the physical space to support. In an example, iBypass high density device may include a memory 1240 (storage component). This shared memory may be made accessible to the connected network arrangements (via FPGA 1208). Accordingly, activities (such as statistical data collection, for example) that may have been unsupported by a network arrangement due to hardware limitation (such as no memory component) may now be implemented, if so desired, by taking advantage of the shared resources.

In an embodiment, resource sharing may be provided with an iBypass high density device. In an example, a data path (such as data paths 1250 and 1252 in FIG. 12B) may exist between two network arrangements when the two network arrangements are connected to the iBypass high density device. For example, in iBypass high density device 1200, a data path 1230 may exist enabling network arrangement connected through network interface 1210 to interact with network arrangement connected through network interface 1212. Thus, if one of the network arrangements becomes unprotected (when the network arrangement switches to a bypass mode), the data traffic may be routed through the second network arrangement to take advantage of the secured network environment that may exist.

In another embodiment, FPGA 1208 may be configured to manage the resources available through the connected network arrangements. To enable the sharing, a data path (such as data paths 1230, 1232, 1234, and 1236) may exist between FPGA 1208 and each network arrangement. Consider the situation wherein, for example, dual bypass module 200 becomes an unsecured network environment. Unlike the prior art, the data traffic may be sent along data path 1230 to FPGA 1208. From there FGPA 1208 may make a determination which secured network arrangement may have the capacity to handle additional data traffic, thereby providing the operator time to perform the maintenance to enable the dual bypass module 200, for example, to become a secured network arrangement again.

Figure 12B:
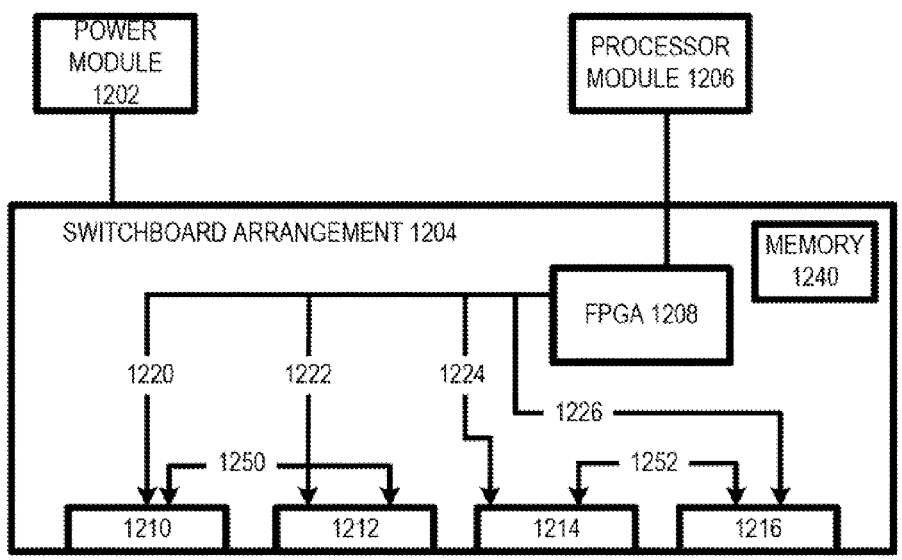

As can be appreciated from FIGS. 12A and 12B, an iBypass high density device facilitates the sharing of available network resources. Thus, each network arrangement is now not just protected by its own monitoring/security system arrangement but may also share in other network arrangement's monitoring/security systems. With the iBypass high density device, the possibility of an unsecured environment is substantially eliminated since the possibility of all network arrangements being unsecured at any one time is most unlikely.

In another aspect of the invention, the inventors realized a plurality of statistical data may be collected by the network arrangement and/or the iBypass high density device. Examples of statistical data may include, but are not limited to, real-time utilization rate of network capacity, average utilization rate, highest peak of traffic peaks, traffic types (fault conditions, and the like. In an embodiment of the invention, a logic arrangement, such as an FPGA (field-programmable gate array), an application-specific integrated circuit (ASIC), complex programmable logic device (CPLD), and the like, may be employed to analyze the statistical data and to generate the statistical data. As can be appreciated from the foregoing, the logic arrangement that may be employed to perform the analysis and to calculate the statistical data may vary depending upon the manufacturing preference. In an example, the logic arrangement may include a single programmable component (such as a FPGA). In another example, the logic arrangement may be a set of programmable components (such as a set of FPGAs), with each programmable component being configured to perform different function. In yet another example, the logic arrangement may include a set of programmable components (such as a set of FPGAs) and a set of programmable digital electronic component (such as a set of microprocessors).

As can be appreciated from the foregoing, the statistical data may be made accessible through a plurality of means. In an example, the statistical data may be transmitted to a designated location. In another example, the statistical data may be stored in a database (within memory 1240, for example) and may be made available at a later date for analysis.

As can be appreciated from the foregoing, one or more embodiments of the present invention provide for arrangements and methods for providing a secured network environment. By integrating the various different monitoring/security functions within a dual bypass module, the cost of providing a secured network environment is reduced. Further, by providing an iBypass high density device to support multiple network arrangements, such as dual bypass modules, resource sharing is provided across network arrangements, thereby enhancing the capability of each network arrangement while providing a stronger and more secured network environment.

In this document, various implementations may be discussed using an intrusion prevention system, as an example. This invention, however, is not limited to intrusion prevention system and may include any monitoring and/or security arrangement (e.g., firewalls, intrusion detection system, and the like). Instead, the discussions are meant as examples and the invention is not limited by the examples presented.

In this document, examples may be provided in which a half-duplex network may be employed to illustrate embodiments of the invention. This invention, however, is not limited to a half-duplex network and may also be implemented in a full-duplex network. Instead, the discussions are meant as examples and the invention is not limited by the examples presented.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A dual bypass module comprising a device for managing data traffic transmitted in an integrated secured network environment, the device comprising:
    a set of network ports, said set of network ports including a set of input network ports for receiving data traffic from a network device and a set of output network ports for outputting said data traffic from said network device;
    a set of monitoring ports, said set of monitoring ports being configured for transmitting said data traffic between said dual bypass module and a set of monitoring systems;
    a set of relays configured for controlling the flow of data through said dual bypass module; and a configurable integrated circuit, said configurable integrated circuit including:
a first logic arrangement for determining conditions of said set of monitoring systems, wherein said first logic arrangement includes a sequential heartbeat diagnostic test for:
generating a plurality of sets of sequential heartbeat packets, each set being associated with a respective diagnostic test condition and a respective counter, and inserting said plurality of sets of sequential heartbeat packets into said data traffic flowing between a network tap and a first monitoring system, and
receiving said data traffic from said first monitoring system and incrementing the counters for the diagnostic test conditions based on the presence or absence of the sets of sequential heartbeat packets; and
a second logic arrangement for redirecting said data traffic through a secured alternate path in response to determining that a failure condition exists for the first monitoring system based on the counters for the diagnostic test conditions.

2. The dual bypass module of claim 1 further including an interface for interacting with said dual bypass module.

3. The dual bypass module of claim 2 wherein said interface being at least one of a command Line interface, a web based device, and a system interface.

4. The dual bypass module of claim 1 wherein said configurable integrated circuit is a field-programmable gate array.

5. The dual bypass module of claim 1 wherein said set of monitoring systems being at least one of an intrusion prevention system, an instruction detection system, and a firewall management system.

6. The dual bypass module of claim 1 wherein said set of relays is configured for creating a secured alternate path for routing said data traffic when power disruption occurs.

7. The dual bypass module of claim 1 wherein said second logic arrangement includes said logic component redirecting said data traffic from said first monitoring system to a second monitoring system when said fail condition exists.

8. A dual bypass module comprising a device for managing data traffic transmitted in an integrated secured network environment, the device comprising:
a set of network ports, said set of network ports including a set of input network ports for receiving data traffic from a network device and a set of output network ports for outputting said data traffic from said network device;
a set of monitoring ports, said set of monitoring ports being configured for transmitting said data traffic between said dual bypass module and a set of monitoring systems, wherein said data traffic is configured to traverse network ports irrespective of whether power is provided to circuitry of said dual bypass module;
a first logic arrangement for identifying conditions of said set of monitoring systems, said first logic arrangement includes a sequential heartbeat diagnostic test for:
generating a plurality of sets of sequential heartbeat packets, each set being associated with a respective diagnostic test condition and a respective counter, and inserting said plurality of sets of sequential heartbeat packets into said data traffic flowing between a network tap and a first monitoring system, and
receiving said data traffic from said first monitoring system and incrementing the counters for the diagnostic test conditions based on the presence or absence of the sets of sequential heartbeat packets;
a second logic arrangement for redirecting said data traffic through a secured alternate path in response to determining that a failure condition exists for the first monitoring system based on the counters for the diagnostic test conditions providing a high availability secure environment; and
a third logic arrangement for establishing a redundant path arrangements.

9. The dual bypass module of claim 8 further including a set of relays configured for controlling the flow of data through said dual bypass module, wherein said set of relays is configured for creating a secured alternate path for routing said data traffic when power disruption occurs.

10. The dual bypass module of claim 8 further including an interface for interacting with said dual bypass module, wherein said interface being at least one of a command line interface, a web based device, and a system interface.

11. The dual bypass module of claim 8 wherein said first logic arrangement is a field-programmable gate array.

12. The dual bypass module of claim 8 wherein said second logic arrangement is a field-programmable gate array.

13. The dual bypass module of claim 8 wherein said third logic arrangement is a field-programmable gate array.

14. The dual bypass module of claim 8 wherein said set of monitoring systems being at least one of an intrusion prevention system, an instruction detection system, and a firewall management system.

15. The dual bypass module of claim 8 wherein said third logic arrangement includes redirecting said data traffic through a secured alternate path when a communication path becomes unavailable.

* * * * *